US008576156B2

(12) United States Patent
Nakamizo et al.

(10) Patent No.: US 8,576,156 B2
(45) Date of Patent: Nov. 5, 2013

(54) LIQUID CRYSTAL DISPLAY DEVICE

(75) Inventors: Masahiko Nakamizo, Osaka (JP); Akihiro Shohraku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/579,355

(22) PCT Filed: Nov. 26, 2010

(86) PCT No.: PCT/JP2010/071164
§ 371 (c)(1),
(2), (4) Date: Aug. 31, 2012

(87) PCT Pub. No.: WO2011/104959
PCT Pub. Date: Sep. 1, 2011

(65) Prior Publication Data
US 2013/0009934 A1  Jan. 10, 2013

(30) Foreign Application Priority Data
Feb. 25, 2010 (JP) ................................. 2010-040885

(51) Int. Cl.
G09G 3/36 (2006.01)
(52) U.S. Cl.
USPC .................. 345/100; 345/92; 345/94; 345/88; 345/208; 345/98; 345/204; 349/38; 428/1.1; 327/589
(58) Field of Classification Search
USPC ........... 345/87, 92, 94, 88, 100, 98, 204, 208; 327/589; 349/38; 428/1.1
See application file for complete search history.

(56) References Cited

U.S. PATENT DOCUMENTS

| 6,724,358 | B2 * | 4/2004 | Ban et al. ...................... 345/92 |
| 2002/0008685 | A1 * | 1/2002 | Ban et al. ...................... 345/92 |
| 2002/0017925 | A1 * | 2/2002 | Teraishi ........................ 327/20 |
| 2003/0234904 | A1 | 12/2003 | Matsuda et al. |
| 2005/0122441 | A1 | 6/2005 | Shimoshikiryoh |
| 2006/0017675 | A1 | 1/2006 | Shimoshikiryoh |
| 2008/0106660 | A1 | 5/2008 | Kitayama et al. |

(Continued)

FOREIGN PATENT DOCUMENTS

JP 07-104246 A 4/1995
JP 2004-021069 A 1/2004

(Continued)

OTHER PUBLICATIONS

Official Communication issued in International Patent Application No. PCT/JP2010/071164, mailed on Feb. 8, 2011.

Primary Examiner — Lun-Yi Lao
Assistant Examiner — Olga Merkoulova
(74) Attorney, Agent, or Firm — Keating & Bennett, LLP

(57) ABSTRACT

An auxiliary capacitor line driving circuit (5), provided in a surrounding region located around a display region (R1) in a liquid crystal display panel, generates auxiliary capacitor driving signals, and includes: first and second voltage trunk lines (VCS1, VCS2) which carry two different voltages, respectively; at least one control signal line (VCTRL1, VCTRL2) carrying one control signal; and a plurality of TFTs (T1, T2, T3, T4) each alternately supplying, to the respective auxiliary capacitor lines (CSn, CSn+1, and the like) in a given cycle, the two different voltages supplied to the auxiliary capacitor line driving circuit (5). Therefore, a liquid crystal display device employing multi-picture element drive method can be provided as a liquid crystal display device that achieves narrowing of a picture frame region as a non-display region and an external circuit board.

12 Claims, 13 Drawing Sheets

(56) References Cited

U.S. PATENT DOCUMENTS

| | | |
|---|---|---|
| 2009/0073103 A1 | 3/2009 | Tajiri |
| 2010/0245305 A1 | 9/2010 | Yokoyama et al. |
| 2011/0050759 A1 | 3/2011 | Katsutani et al. |

FOREIGN PATENT DOCUMENTS

| | | | |
|---|---|---|---|
| JP | 2005-128101 A | 5/2005 | |
| JP | 2005-189804 A | 7/2005 | |
| JP | 2006-39130 A | 2/2006 | |
| JP | 2007-139980 A | 6/2007 | |
| JP | 2008-292788 A | 12/2008 | |
| JP | 2009-075225 A | 4/2009 | |
| JP | 2009-128533 A | 6/2009 | |
| WO | 2006/070829 A1 | 7/2006 | |
| WO | 2009/066591 A1 | 5/2009 | |
| WO | 2009/084280 A1 | 7/2009 | |

\* cited by examiner

F I G. 4
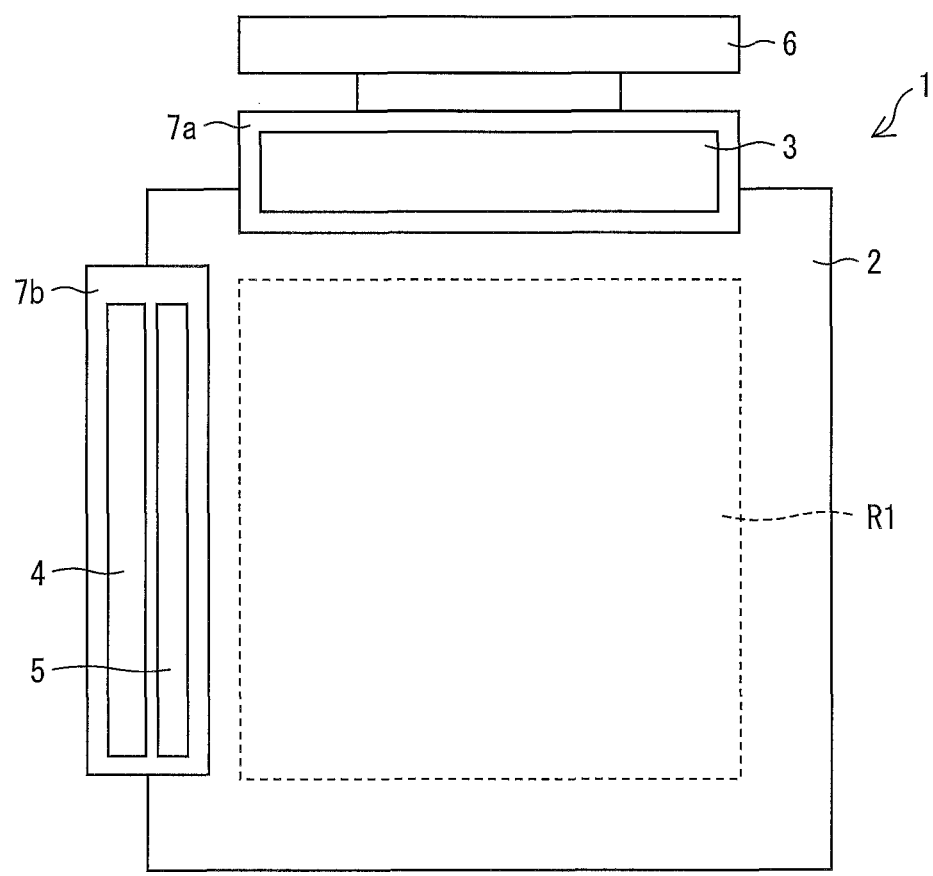

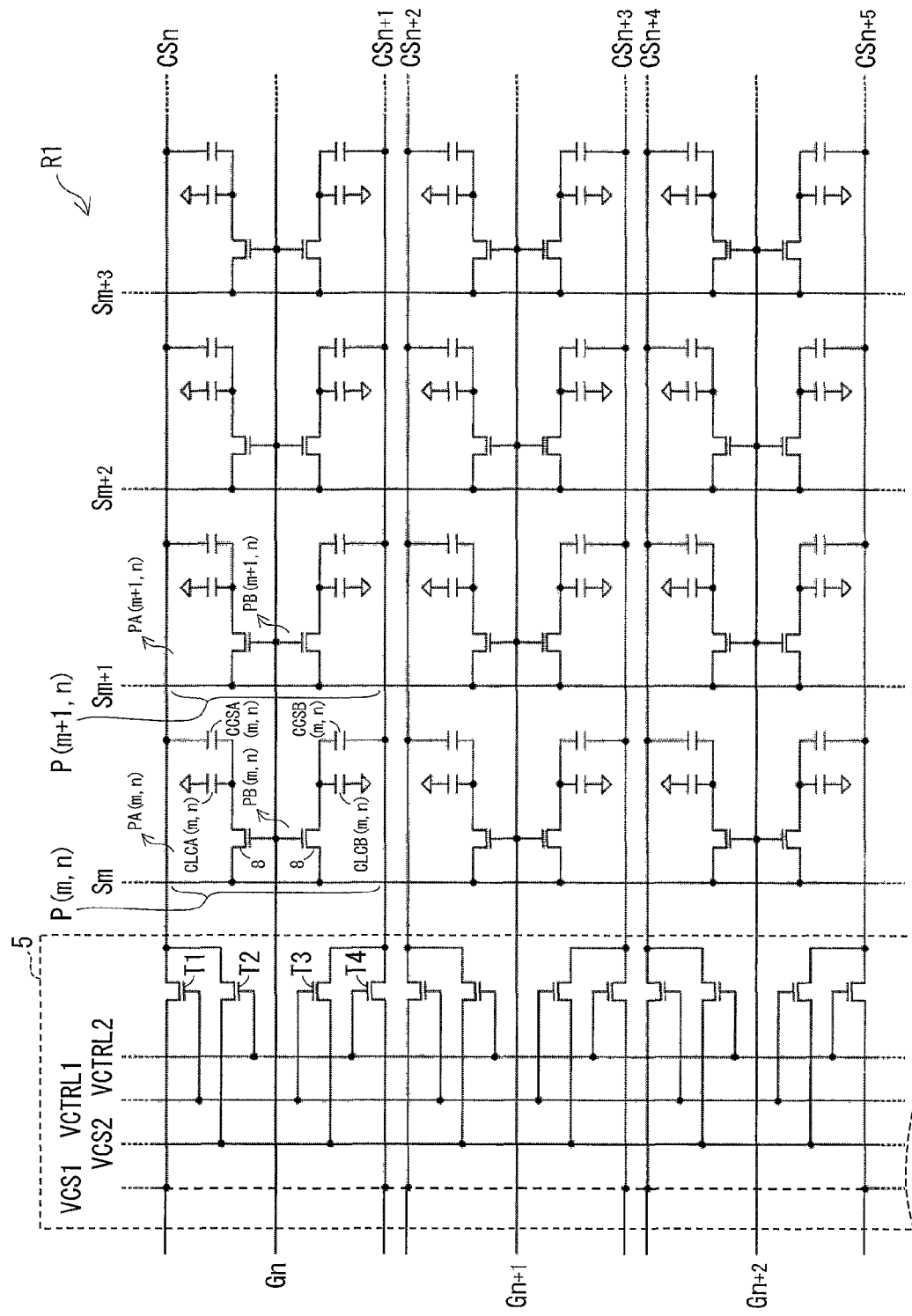
F I G. 5

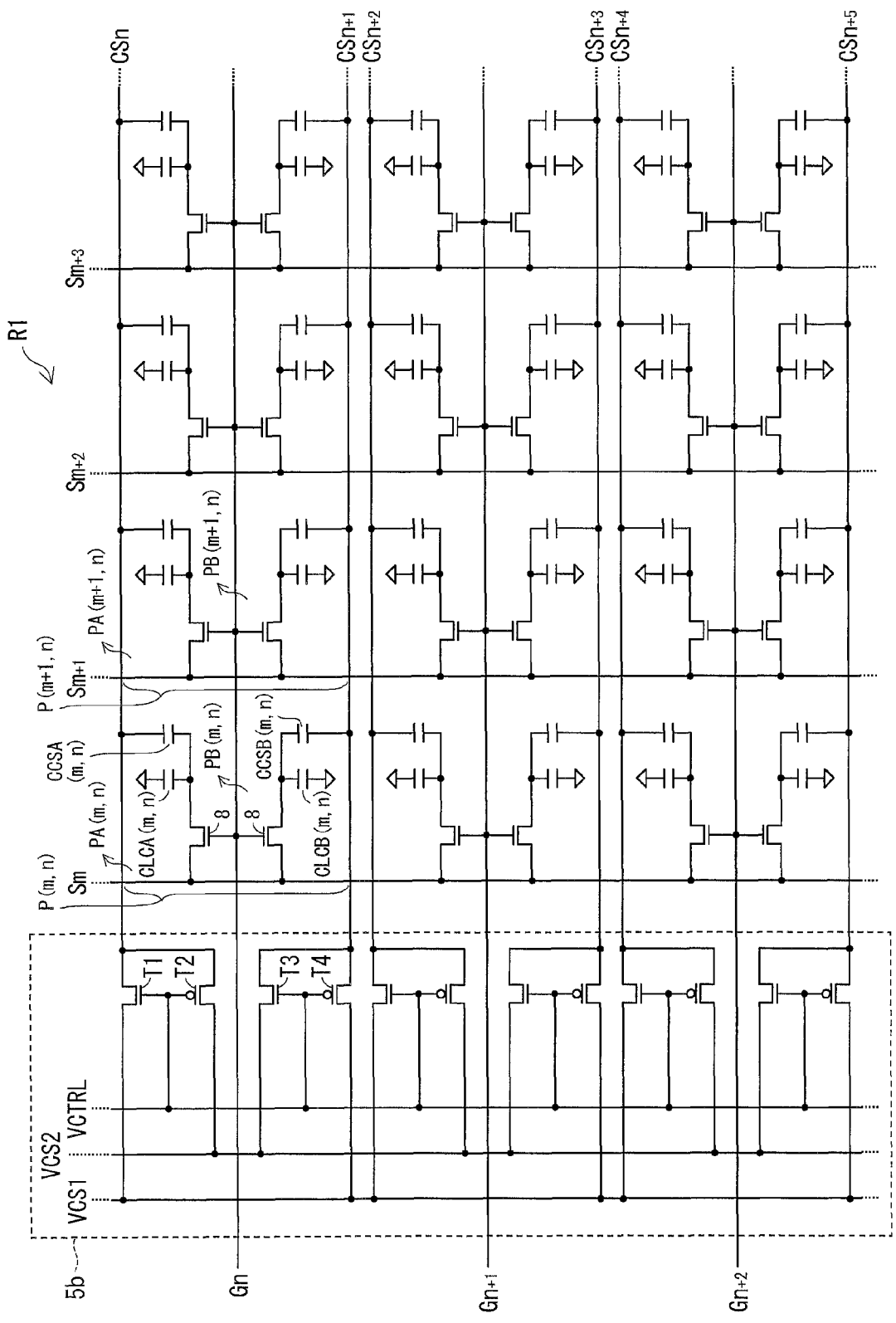
F I G. 9

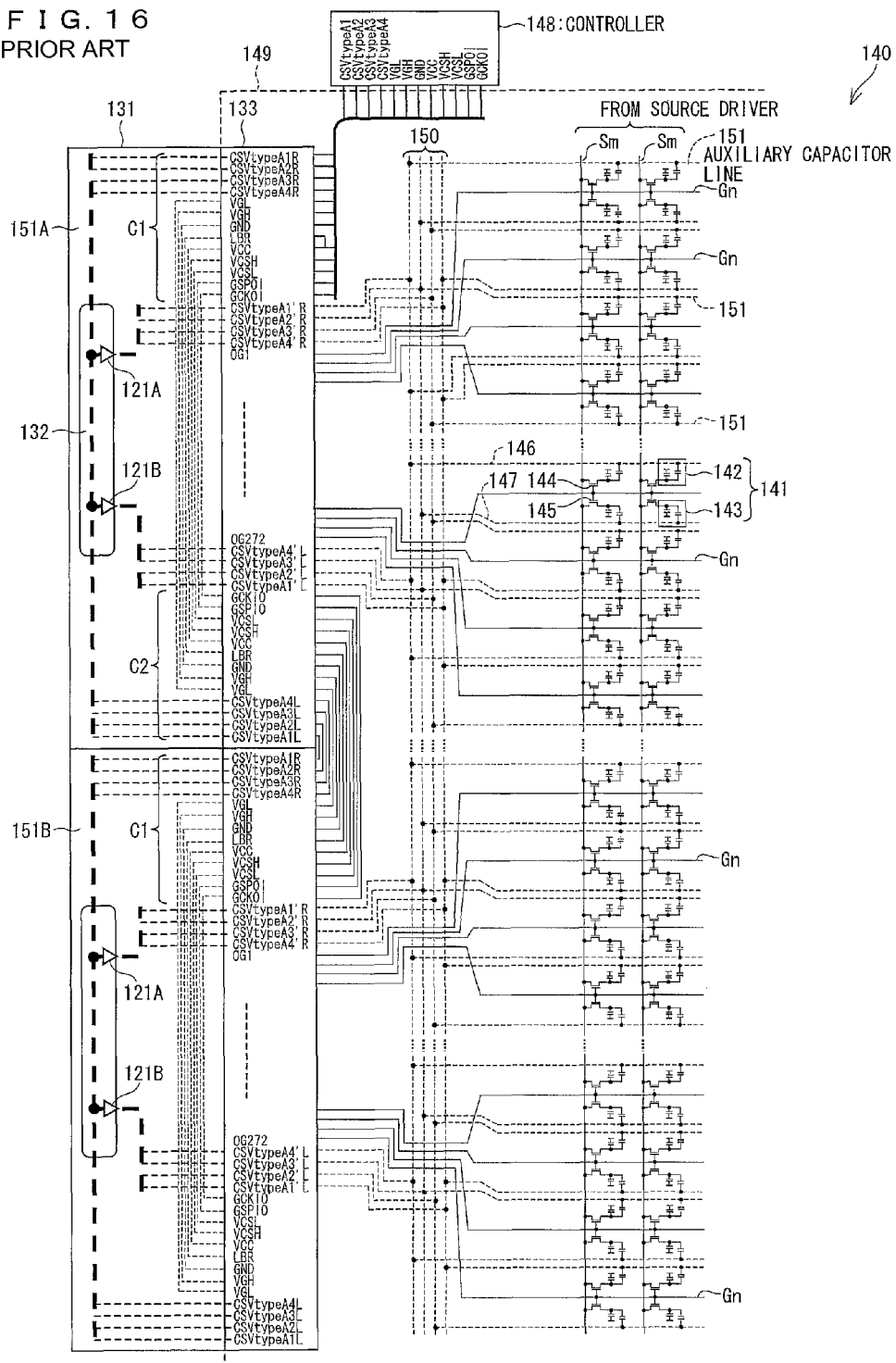

LIQUID CRYSTAL DISPLAY DEVICE

TECHNICAL FIELD

The present invention relates to a liquid crystal display device, particularly to a liquid crystal display device employing a multi-picture element drive method, with an improved viewing angle dependence of γ characteristics of the liquid crystal display device.

BACKGROUND ART

In recent years, liquid crystal display devices are rapidly becoming popular as alternatives to cathode-ray tubes (CRTs). Such liquid crystal display devices are used in a wide variety of devices, such as television sets, monitors, and mobile phones, because of their characteristics such as energy saving, low-profile, and lightweight.

The liquid crystal display device most commonly used in the past is a TN (Twisted Nematic) mode liquid crystal display device that uses liquid crystal molecules having a positive dielectric anisotropy.

The TN mode liquid crystal display device has wide production margin and excellent productivity; however, the TN mode liquid crystal display device has the problem that a contrast ratio greatly lowers when a display surface of the liquid crystal display device is viewed from directions other than the front, for example, when it is viewed at oblique angles from above, from underneath, from the left side, and from the right side. More specifically, the TN mode liquid crystal display device has the problem that when the display surface is viewed from the front, multiple levels of grayscale from black to white can be clearly observed, but when the display surface is viewed at oblique angles from above, from underneath, from the left side, and from the right side, difference in luminance between the levels of grayscale becomes very unclear. In addition, the TN mode liquid crystal display device has the problem of the so-called grayscale inversion phenomenon that a darker part when the display surface is viewed from the front appears to be brighter when the display surface is viewed at oblique angles from above, from underneath, from the left side, and from the right side.

As described above, the TN mode liquid crystal display device has the problem that its image quality is significantly deteriorated when the liquid crystal display device is viewed at oblique angles from above, from underneath, from the left side, and from the right side, as compared with when viewed from the front.

Hence, the TN mode liquid crystal display device has high dependence of image quality on viewing angles, and is therefore not suitable for an application in which the liquid crystal display device is expected to be viewed from a direction other than the front.

Known as liquid crystal display devices in which such viewing angle dependence of image quality is improved are an IPS (In-Plane Switching) mode liquid crystal display device, an MVA (Multi-domain Vertical Alignment) mode liquid crystal display device, an ASM (Axially Symmetric Aligned Micro-cell) mode liquid crystal display device, etc.

Each of the liquid crystal display devices (liquid crystal display devices in wide viewing angle mode) with improved viewing angle dependence of image quality alleviates the above-described problems, i.e. the decrease in contrast ratio and the grayscale inversion, that can occur when the display surface of the liquid crystal display device is viewed at the oblique angles, to some extent. However, the viewing angle dependence of the γ characteristics, which shows a relation between display luminance and grayscale, is not still improved.

Such a viewing angle dependence of the γ characteristics is more prominent in the MVA mode liquid crystal display device and the ASM mode liquid crystal display device, than in the IPS mode liquid crystal display device.

Generally, γ characteristics of a liquid crystal display device is optimized with reference to γ characteristics obtained when the display surface of the liquid crystal display device is viewed from the front. However, when the γ characteristics has viewing angle dependence, a shift occurs between the γ characteristics obtained when the display surface is viewed at the oblique angles and the γ characteristic optimized when viewed from the front.

The amount of shift is not so great and is not a problem in the vicinities of a region showing the highest display luminance and a region showing the lowest display luminance. However, in a region showing halftones, display luminance obtained when viewed at the oblique angles is considerably higher than that obtained when viewed from the front. This results in deterioration in image quality, such as excess brightness, when the display surface is viewed at the oblique angles.

In view of this, as shown in FIG. 14, there has been proposed a liquid crystal display device employing a multi-picture element drive method (area coverage modulation), with an improved viewing angle dependence of γ characteristics, wherein picture elements are driven in such a manner that an average luminance of two sub-picture elements which constitute one picture element becomes a target luminance of the one picture element.

In the liquid crystal display device employing a multi-picture element drive method, the two sub-picture elements are allowed to provide display of high luminance level and display of low luminance level, respectively, both of which cause small variations in display luminance depending upon viewing angles, so that display of a halftone is provided by averaging luminance levels of these two sub-picture elements. Thus, it is possible to achieve a liquid crystal display device with an improved viewing angle dependence of the γ characteristics.

The following will describe a schematic configuration of an example of a conventional liquid crystal display device employing multi-picture element drive method, with reference to FIG. 14.

As shown in FIG. 14, one picture element 100 is composed of two separate sub-picture elements 101a and 101b. The sub-picture element 101a is connected to a scanning line Gn and a signal line Sm via a TFT (Thin Film Transistor) 102a. Further, the sub-picture element 101b is connected to the scanning line Gn and the signal line Sm via a TFT 102b.

That is, gate electrodes of the TFTs 102a and 102b are connected to the common scanning line Gn, whereas source electrodes of the TFTs 102a and 102b are connected to the common signal line Sm.

Further, the sub-picture element 101a has a liquid crystal capacitor and an auxiliary capacitor. The liquid crystal capacitor is made up of a sub-picture element electrode 103a, a liquid crystal layer (not shown), and a counter electrode (not shown). The auxiliary capacitor is made up of (i) an auxiliary capacitor electrode 104a electrically connected to the sub-picture element electrode 103a, (ii) an insulating layer 105a, and (iii) an auxiliary-capacitor counter electrode 107a electrically connected to an auxiliary capacitor line 106a.

On the other hand, as is the case with the sub-picture element 101a, the sub-picture element 101b has a liquid crystal capacitor and an auxiliary capacitor. The liquid crystal capacitor is made up of a sub-picture element electrode 103b, a liquid crystal layer (not shown), and a counter electrode (not shown). The auxiliary capacitor is made up of (i) an auxiliary capacitor electrode 104b electrically connected to the sub-picture element electrode 103b, (ii) an insulating layer 105b, and (iii) an auxiliary-capacitor counter electrode 107b electrically connected to an auxiliary capacitor line 106b.

In the above-configured liquid crystal display device employing a multi-picture element drive method, after writing to the separate sub-picture elements 101a and 101b is completed and the TFTs 102a and 102b are turned off, voltages on the auxiliary capacitor lines 106a and 106b are changed to mutually different voltages. This allows the sub-picture elements 101a and 101b to practically hold different voltages.

FIG. 15 is a diagram schematically showing an equivalent circuit of a liquid crystal display device having a multi-picture element structure shown in FIG. 14.

As shown in FIG. 15, the auxiliary capacitor lines 106a and 106b are electrically connected respectively to two auxiliary capacitor trunk lines 108 and 109, which are electrically independent from each other. Applied to the auxiliary capacitor trunk lines 108 and 109, respectively, are vibration voltages being substantially identical in amplitude and vibration period with each other and being about 180° out of phase with each other.

Accordingly, the vibration voltages of mutually reversed phases are applied to the auxiliary capacitor lines 106a and 106b, respectively. This allows the sub-picture elements 101a and 101b to provide mutually different luminance levels (levels of grayscale), i.e. display of a bright luminance level and display of a dark luminance level both of which cause small variations in display luminance depending upon viewing angles. With an average luminance of the luminance levels of these sub-picture elements 101a and 101b, display of a halftone can be provided. Therefore, it is possible to achieve a liquid crystal display device having an improved viewing angle dependence of γ characteristics.

However, in a large liquid crystal display device employing a multi-picture element drive method in which auxiliary capacitor trunk lines 108 and 109 and auxiliary capacitor lines 106a and 106b have high load capacitances and high resistances, a high-definition liquid crystal display device, with a short horizontal scanning period, employing a multi-picture element drive method, a high-speed drive liquid crystal display device, with a short vertical scanning period and a short horizontal scanning period, employing a multi-picture element drive method, and the like liquid crystal display devices, luminance unevenness occurs due to adverse effects of delays and waveform distortions of auxiliary capacitor driving signals (vibration voltages) applied to the auxiliary capacitor trunk lines 108 and 109.

In order to prevent such luminance unevenness, it is necessary to reduce load capacitances and resistances of the auxiliary capacitor trunk lines 108 and 109 and the auxiliary capacitor lines 106a and 106b. By providing sufficiently broad line widths of the auxiliary capacitor trunk lines 108 and 109 and the auxiliary capacitor lines 106a and 106b, it is possible to prevent the luminance unevenness.

However, the liquid crystal display device having the configuration described above causes increase of an area in which the auxiliary capacitor trunk lines 108 and 109 and the auxiliary capacitor lines 106a and 106b are formed. This results in increase in area of a picture frame region as a non-display region in the liquid crystal display device, and decrease in aperture ratio. Therefore, the liquid crystal display device having the configuration described above is not preferred.

Alternatively, in order to reduce such luminance unevenness, vibration periods of the auxiliary-capacitor driving signals to be applied to the auxiliary capacitor trunk lines 108 and 109 can be lengthened. This makes it possible to prevent the influence of waveform distortions, thus reducing the luminance unevenness.

However, in order to carry out auxiliary capacitor driving that allows two sub-picture elements 101a and 101b connected to the respective scanning lines to hold different voltages, such an arrangement is accompanied by increase in type of required auxiliary capacitor driving signals and increase in number of auxiliary capacitor trunk lines. Further, one method for accelerating the rise of a signal when a delay is significant is to employ signal pre-emphasis driving. This, however, requires the auxiliary capacitor driving signal to be a voltage of four levels of amplitude although the auxiliary capacitor driving signal is generally a voltage of two levels of amplitude.

Therefore, the above-described approach to preventing luminance unevenness requires increase in number of auxiliary capacitor trunk lines and requires a large number of voltage sources for producing a variety of auxiliary capacitor driving signals, resulting in increase of a picture frame region of the liquid crystal display device and increase of a control board (external circuit board) provided outside the liquid crystal display panel. Thus, the above-described approach to preventing luminance unevenness is not preferred.

As described above, in the liquid crystal display device employing a multi-picture element drive method, it is difficult to narrow the picture frame region as a non-display region and the external circuit board. Therefore, an attempt to narrow such a non-display region has been made.

For example, Patent Literature 1 describes the configuration by which auxiliary capacitor driving signals are supplied to auxiliary capacitor lines via buffers capable of shaping waveforms of the auxiliary capacitor driving signals.

FIG. 16 is a view showing a schematic configuration of a liquid crystal display device configured to supply the auxiliary capacitor driving signals to the auxiliary capacitor lines via the buffers.

In the configuration of a liquid crystal display panel 140 shown in FIG. 16, the structure of display picture elements 141 each of which is composed of a plurality of sub-picture elements 142 and 143, and connections of sub-picture elements 142 and 143 and TFTs 144 and 145 with scanning lines Gn and signal lines Sm are the same as those previously described with reference to FIG. 14, and descriptions thereof are therefore omitted.

In the liquid crystal display panel 140 shown in FIG. 16, auxiliary capacitor driving signals, gate driver control signals (scan start signal and driving clock signal) upon which scanning line driving signals are based, and various kinds of power supply voltages are supplied from the controller 148 to the gate driver 151A.

To the gate driver 151A, auxiliary capacitor driving signals are inputted from terminals "CSVtypeA1R" through "CSVtypeA4R" of a terminal group C1. Further, the gate driver control signals are inputted from terminals "GSPOI" and "GCKOI" of the terminal group C1 in the gate driver 151A, and the power supply voltages are inputted from terminals "VGL", "VGH", "GND", "VCC", "VCSL", and "VCSH" of the terminal group C1 in the gate driver 151A.

As shown in FIG. 16, the terminal groups C1 and C2 are provided at both ends of a terminal section 133 in a tape 131 of the gate driver 151A, and the terminals having the same terminal names in the terminal groups C1 and C2 are connected to each other. Further, the terminals "CSVtypeA1R" through "CSVtypeA4R" provided in the terminal group C1 are connected to the terminals "CSVtypeA1L" through "CSVtypeA4L" provided in the terminal group C2.

Therefore, the terminals "CSVtypeA1L" through "CSVtypeA4L" provided in the terminal group C2 of the gate driver 151A are connected respectively to terminals "CSVtypeA1R" through "CSVtypeA4R" provided in the terminal group C1 of a gate driver 151B having the same configuration as that of the gate driver 151A, via lines provided on a glass substrate 149. This allows the liquid crystal display panel 140 to have such an configuration that the auxiliary capacitor driving signals, the gate driver control signals, and the various kinds of power supply voltages, all of which are inputted to the gate driver 151A, can be supplied from the gate driver 151A to the gate driver 151B.

In addition, in the liquid crystal display panel 140, the gate driver 151A produces scanning line driving signals by using the incoming signals from the controller 148 upon which the scanning line driving signals are based, and then provide the scanning line driving signals to the scanning lines Gn connected to the terminals "OG1" through "OG272" of the gate driver 151A.

Meanwhile, the incoming auxiliary capacitor driving signals from the controller 148 subjected to waveform shaping in the buffers 121A and 121B provided in an integrated circuit 132 of the gate driver 151A, and then outputted from the terminals "CSVtypeA1"R" through "CSVtypeA4'R" and "CSVtypeA1'L through "CSVtypeA4'L". Note that the terminals "CSVtypeA1'R" through "CSVtypeA4'R" and "CSVtypeA1'L" through "CSVtypeA4'L" are connected to auxiliary capacitor trunk lines 150 in the liquid crystal display panel 140.

Further, the auxiliary capacitor trunk lines 150 are connected to the auxiliary capacitor lines 151, and the auxiliary capacitor driving signals with reduced waveform distortions to be outputted from the buffers 121A and 121B to the terminals "CSVtypeA1'R." through "CSVtypeA4'R." and "CSVtypeA1'R" through "CSVtypeA4'L" can be provided to all of the auxiliary capacitor lines 151 via the auxiliary capacitor trunk lines 150 connected to the terminals "CSVtypeA1'R" through "CSVtypeA4'R." and "CSVtypeA1'L" through "CSVtypeA4'L". This realizes the configuration that allows the sub-picture elements 142 and 143 to provide display of mutually different luminance levels.

According to the above configuration, the auxiliary capacitor driving signals are supplied via the buffers to the auxiliary capacitor lines 151. This makes it possible to enhance a driving ability of the auxiliary capacitors. Therefore, even when line widths of the auxiliary capacitor trunk lines 150 are narrow, it is possible to prevent the occurrence of luminance unevenness caused by waveform distortions or for other reasons.

Further, such a configuration eliminates the need for making vibration periods of the auxiliary capacitor driving signals longer than those in the conventional configuration, and thus eliminates the need for increasing the type of auxiliary capacitor driving signals.

Thus, Patent Literature 1 described that the liquid crystal display device disclosed therein enables narrowing of a picture frame region as a non-display region and an external circuit board.

CITATION LIST

Patent Literatures

Patent Literature 1
Japanese Patent Application Publication, Tokukai, No. 2009-128533 A (Publication Date: Jun. 11, 2009)

Patent Literature 2
Japanese Patent Application Publication, Tokukai, No. 2005-189804 A (Publication Date: Jul. 14, 2005)
Patent Literature 3
Japanese Patent Application Publication, Tokukai, No. 2006-039130 A (Publication Date: Feb. 9, 2006)
Patent Literature 4
International Patent Publication No. WO2006/070829 (Publication Date: Jul. 6, 2006)

SUMMARY OF INVENTION

Technical Problem

However, as shown in FIG. 16, the liquid crystal display device described in Patent Literature 1 has a configuration that requires placement of a plurality of auxiliary capacitor trunk lines 150, which unite the auxiliary capacitor lines 151 in order to reduce load on each of the buffers, and also requires the buffers 121A and 121B (buffer circuits) and the controller 148 (external driving circuit) all of which are provided to independently drive the auxiliary capacitor trunk lines 150.

According to the above-described configuration, the use of the buffers 121A and 121B and reception of outputs from the buffers 121A and 121B at a plurality of terminals are made to reduce the number of the auxiliary capacitor trunk lines 150. However, the use of the buffers 121A and 121B requires an external driving circuit which is different from the conventional one, and further causes signal delay because the external driving circuit is provided outside the liquid crystal display panel 140.

Therefore, the above-described configuration results in increase in size of the external driving circuit provided outside the liquid crystal display panel 140 and increase in area of the external circuit board. Further, a solution to the problem of signal delay requires providing separate auxiliary capacitor lines 151 and independently driving the separate auxiliary capacitor lines 151. This still increases the area where the auxiliary capacitor trunk lines 150 are formed and makes it difficult to achieve narrowing of the picture frame region as a non-display region and the external circuit board in the liquid crystal display device to an acceptable level.

The present invention has been attained in view of the above problem, and an object of the present invention is to provide a liquid crystal display device that enables narrowing of a picture frame region as a non-display region and an external circuit board, in a liquid crystal display device employing a multi-picture element drive method.

Solution to Problem

In order to solve the above problem, a liquid crystal display device of the present invention includes: a liquid crystal display panel including a display region, the display region including: (i) picture elements each of which is made up of a plurality of sub-picture elements; and (ii) active elements provided respectively to the sub-picture elements; a scanning line driving circuit that supplies scan signals to scanning lines provided in the display region; and a signal line driving circuit that supplies data signals to signal lines provided in the display region, the sub-picture elements having respective auxiliary capacitor elements, the auxiliary capacitor elements being connected respectively to different auxiliary capacitor lines, the auxiliary capacitor elements being driven in accordance with auxiliary capacitor driving signals supplied respectively to the auxiliary capacitor lines, so that the sub-picture elements provide displays of mutually different luminances, wherein an auxiliary capacitor line driving circuit, provided in a surrounding region located around the display region in the liquid crystal display panel, generates the auxiliary capacitor driving signals, and includes: first and second voltage trunk lines which carry two different voltages, respectively; at least one control signal line carrying one control signal; and a plurality of switching elements each alternately supplying, to the respective auxiliary capacitor lines in a given cycle in accordance with the control signal, the two different voltages supplied to the auxiliary capacitor line driving circuit.

The conventional configuration was such that the auxiliary capacitor line driving circuit which supplies the auxiliary capacitor driving signals to the auxiliary capacitor lines was provided outside the liquid crystal display panel, and the auxiliary capacitor driving signals were supplied from the auxiliary capacitor line driving circuit to the auxiliary capacitor lines via auxiliary capacitor trunk lines which are provided in the liquid crystal display panel.

In such a conventional configuration, the auxiliary capacitor line driving circuit is provided outside the liquid crystal display panel. This configuration is always accompanied by the problem of signal delay particularly in a large liquid crystal display device. One remedy for the problem of signal delay can be broadening of pulse widths of the auxiliary capacitor driving signals to be supplied to the auxiliary capacitor lines. This, however, increases the type of required auxiliary capacitor driving signals and increases the number of auxiliary capacitor trunk lines.

Consequently, the above-described conventional configuration resulted in an increased picture frame region of the liquid crystal display device where there are provided (i) the external circuit board that generates the required auxiliary capacitor driving signals in large number and (ii) the auxiliary capacitor trunk lines.

Further, broadening the line widths of the auxiliary capacitor trunk lines to reduce resistance (load) further increases the picture frame region of the liquid crystal display device where the auxiliary capacitor trunk lines are provided.

On the contrary, according to the configuration of the present invention, the auxiliary capacitor line driving circuit that supplies the auxiliary capacitor driving signals to the auxiliary capacitor lines are provided in the surrounding area located around the display region in the liquid crystal display panel.

That is, according to a liquid crystal display device of the present invention, the auxiliary capacitor line driving circuit is provided in the surrounding region located around the display region of a liquid crystal display panel, and a signal supplied from the outside of the liquid crystal display panel to the auxiliary capacitor line driving circuit is not the auxiliary capacitor driving signal but rather a control signal for driving the auxiliary capacitor line driving circuit. Such a configuration greatly alleviates the above-described signal delay.

This eliminates the need for broadening the pulse widths of the auxiliary capacitor driving signals supplied to the auxiliary capacitor lines. This is not accompanied by increase in the type of required auxiliary capacitor driving signals and increase of the number of auxiliary capacitor lines driven in an electrically independent manner.

The conventional configuration required provision of about ten auxiliary capacitor trunk lines to avoid the above-described signal delay. On the other hand, the liquid crystal display device of the present invention needs only to provide the first and second voltage trunk lines carrying two different voltages, respectively, and at least one control signal line carrying a control signal. This allows significant reduction of the number of lines to be provided.

Moreover, the above configuration is such that the auxiliary capacitor line driving circuit is provided in the liquid crystal display panel, and the number of output signals from the external circuit board can be reduced. The above configuration enables size reduction of the external circuit board, as compared to the conventional configuration.

As described above, according to the liquid crystal display device of the present invention, it is possible to achieve narrowing of a picture frame region as a non-display region and an external circuit board, in a liquid crystal display device employing a multi-picture element drive method.

Advantageous Effects of Invention

As described above, a liquid crystal display device of the present invention is such that an auxiliary capacitor line driving circuit, provided in a surrounding region located around the display region in the liquid crystal display panel, generates the auxiliary capacitor driving signals, and includes: first and second voltage trunk lines which carry two different voltages, respectively; at least one control signal line carrying one control signal; and a plurality of switching elements each alternately supplying, to the respective auxiliary capacitor lines in a given cycle in accordance with the control signal, the two different voltages supplied to the auxiliary capacitor line driving circuit.

Thus, the effect of achieving a liquid crystal display device that enables narrowing of a picture frame region as a non-display region and an external circuit board is yielded in a liquid crystal display device employing a multi-picture element drive method.

BRIEF DESCRIPTION OF DRAWINGS

FIG. 1 is a diagram schematically showing part of an equivalent circuit of (i) a display region and (ii) an auxiliary capacitor line driving circuit, both of which are provided in a liquid crystal display device according to an embodiment of the present invention.

FIG. 2 is a view showing a profile of dc voltages V1 and V2 supplied to trunk lines VCS1 and VCS2, respectively, waveforms of control signals supplied to the trunk lines VCTRL1 and VCTRL2, respectively, and waveforms of voltages supplied to the auxiliary capacitor lines, in the liquid crystal display device according to an embodiment of the present invention.

FIG. 3 is a view showing waveforms of voltages supplied to the auxiliary capacitor lines with reference to a voltage waveform of the scanning line and voltages of the sub-picture element electrodes in the liquid crystal display device according to an embodiment of the present invention.

FIG. 4

FIG. 4 is a view showing the schematic configuration of a liquid crystal display device according to an embodiment of the present invention.

FIG. 5

FIG. 5 is a diagram schematically showing part of an equivalent circuit of (i) the display region and (ii) the auxiliary capacitor line driving circuit, both of which are shown in FIG. 4, in a case where the trunk lines VCS1 and VCS2 are placed so as to match each other.

FIG. 6 is a diagram schematically showing an equivalent circuit of an auxiliary capacitor line driving circuit provided in a liquid crystal display device according to another embodiment of the present invention.

FIG. 7 is a view showing a profile of dc voltages V1 and V2 supplied to the trunk lines VCS1 and VCS2, respectively, waveforms of control signals supplied to the trunk lines VCTRL1 and VCTRL2, and waveforms of voltages supplied to the auxiliary capacitor lines, in a liquid crystal display device according to still another embodiment of the present invention.

FIG. 8 is a view showing waveforms of voltages supplied to the auxiliary capacitor lines and voltages of the sub-picture element electrodes, with reference to a voltage waveform of the scanning line, in a liquid crystal display device according to yet another embodiment of the present invention.

FIG. 9

FIG. 9 is a diagram schematically showing part of an equivalent circuit of (i) a display region and (ii) an auxiliary capacitor line driving circuit, both of which are provided in a liquid crystal display device according to still another embodiment of the present invention.

FIG. 10 is a diagram schematically showing part of an equivalent circuit of (i) a display region and (ii) an auxiliary capacitor line driving circuit, both of which are provided in a liquid crystal display device according to yet another embodiment of the present invention.

FIG. 11 is a view showing an auxiliary capacitor driving signal generated by an auxiliary capacitor line driving circuit which has the pre-emphasis function and is provided in a liquid crystal display device according to still another embodiment of the present invention and an auxiliary capacitor driving signal generated by an auxiliary capacitor line driving circuit which does not have the pre-emphasis function.

FIG. 12 is a view showing waveforms of control signals supplied to the trunk lines with reference to a gate clock and waveforms of voltages supplied to the auxiliary capacitor lines, in a liquid crystal display device according to yet another embodiment of the present invention.

FIG. 13 is a view showing waveforms of control signals supplied to the trunk lines with reference to a gate clock and waveforms of voltages supplied to the auxiliary capacitor lines, in a liquid crystal display device according to still another embodiment of the present invention.

FIG. 14 is an explanatory view showing a schematic configuration of an example of the conventional liquid crystal display device employing a multi-picture element driving method.

FIG. 15 is a diagram schematically showing an equivalent circuit of a liquid crystal display device having a multi-picture element structure shown in FIG. 14.

FIG. 16

FIG. 16 is a diagram showing a schematic configuration of the conventional liquid crystal display device configured to supply auxiliary capacitor driving signals to the auxiliary capacitor lines via buffers.

DESCRIPTION OF EMBODIMENTS

The following will describe details of embodiments of the present invention with reference to drawings. It is to be understood that dimensions, types of materials, shapes, relative placements of the constituent members described in the embodiments, and others are only illustrative and are not intended to limit the scope of the present invention.

[Embodiment 1]

The following will describe a liquid crystal display device 1 according to an embodiment of the present invention with reference to the drawings.

Figure 14:
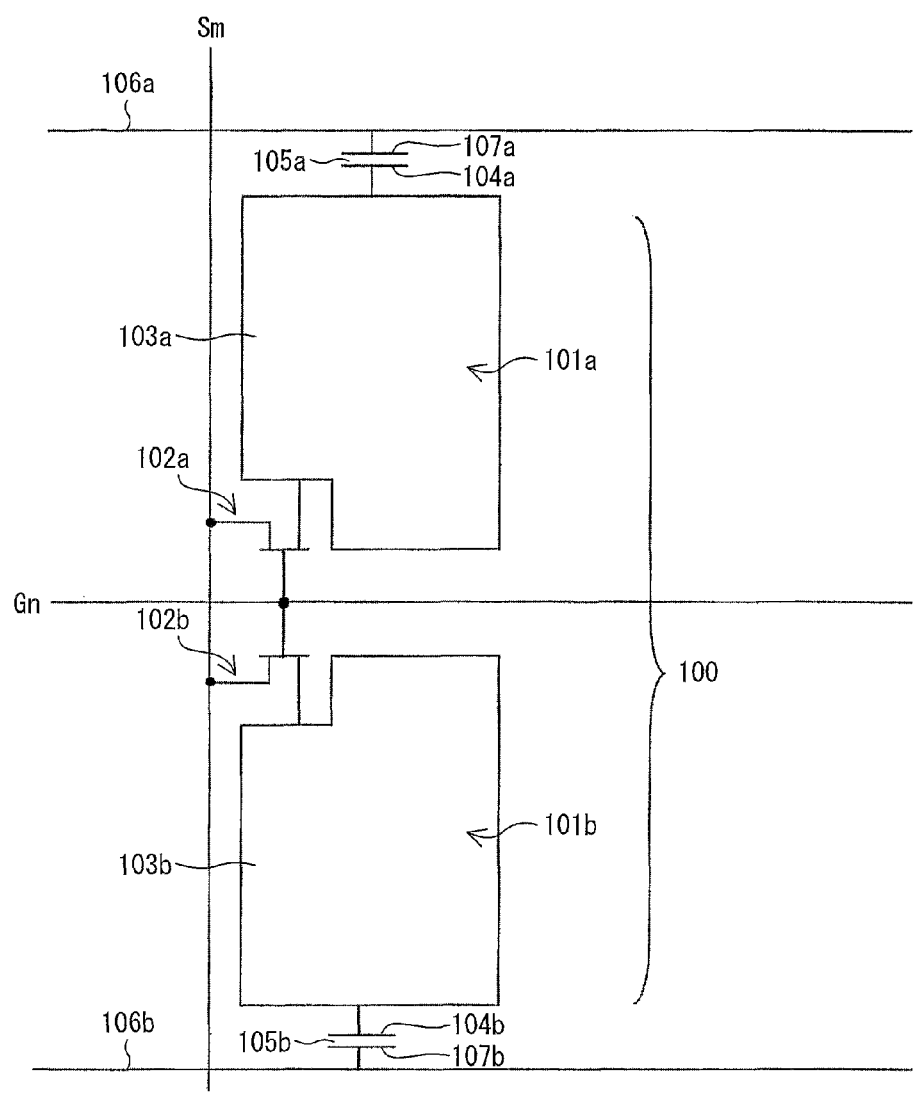
FIG. 14
Figure 15:
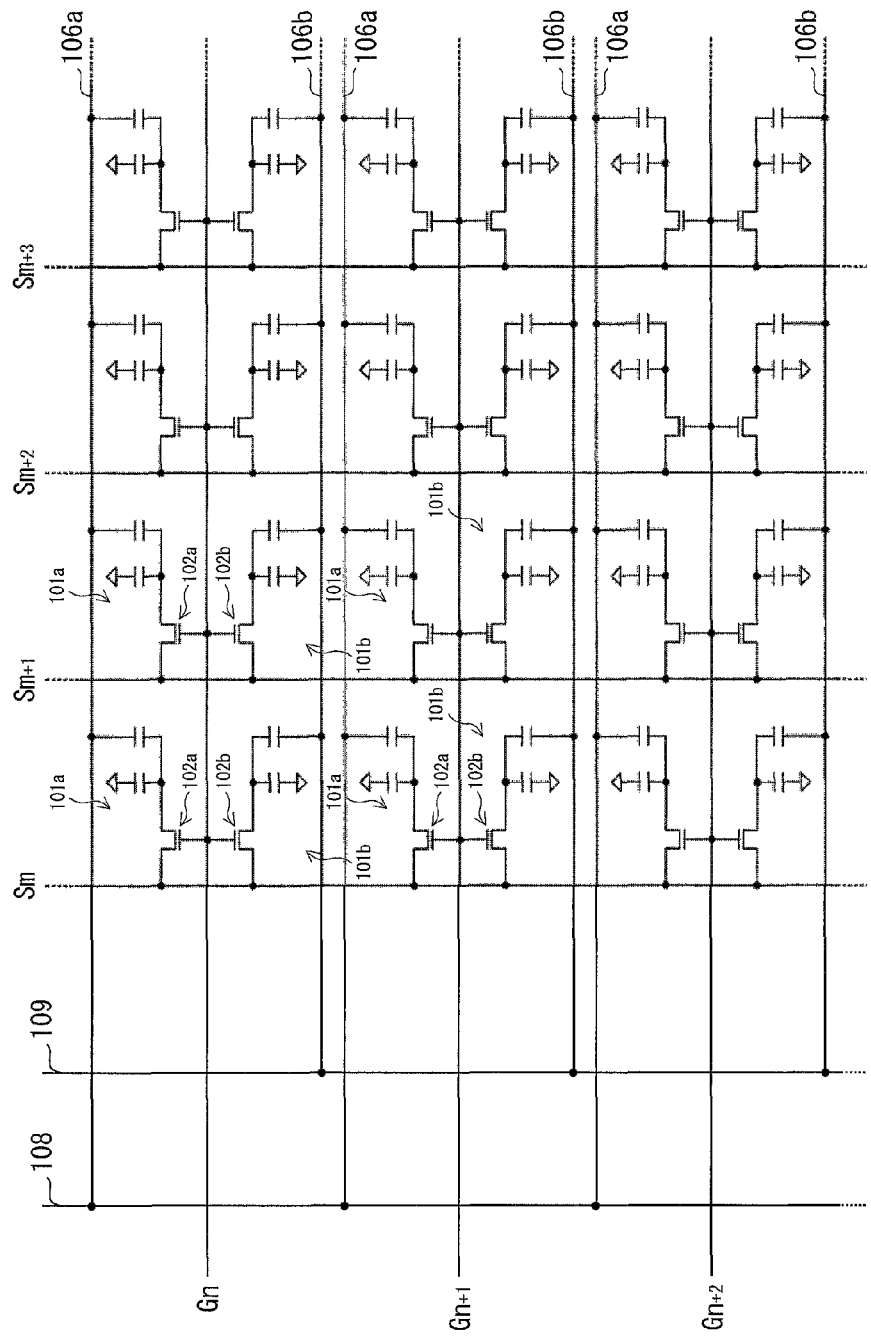
FIG. 15

The liquid crystal display device 1 according to an embodiment of the present invention is configured in the same manner as the conventional liquid crystal display device previously described with reference to FIG. 14, in terms of separation of each display picture element into two sub-picture elements aligned in a row direction and in terms of connections of the sub-picture elements and TFTs with scanning lines Gn and signal lines Sm. However, the liquid crystal display device 1 is different from the conventional liquid crystal display device in that an auxiliary capacitor line driving circuit that generates auxiliary capacitor driving signals is provided in a surrounding region located around a display region R1 of a liquid crystal display panel 2 which is provided in the liquid crystal display device 1.

FIG. 4 is a view showing the schematic configuration of the liquid crystal display device 1 according to an embodiment of the present invention.

As shown in FIG. 4, the liquid crystal display device 1 includes a liquid crystal display panel 2, a control board 6, and flexible printed circuit boards 7a and 7b. The flexible printed circuit boards 7a and 7b are provided in an upper end part and a left end part of the liquid crystal display panel 2, respectively.

The flexible printed circuit board 7a includes a signal line driving circuit 3, whereas the flexible printed circuit board 7b includes a scanning line driving circuit 4 and an auxiliary capacitor line driving circuit 5.

The signal line driving circuit 3 supplies data signals respectively to signal lines (not shown) provided in a display region R1, details of which will be described later. The scanning line driving circuit 4 supplies scan signals respectively to scanning lines (not shown) provided in the display region R1.

Further, the auxiliary capacitor line driving circuit 5 supplies auxiliary capacitor driving signals respectively to auxiliary capacitor lines (not shown) provided in the display region R1.

The control board 6 includes a circuit for supplying voltages, clock signals (control signals), etc. which are necessary to drive the signal line driving circuit 3, the scanning line driving circuit 4, and the auxiliary capacitor line driving circuit 5.

In Embodiment 1, the control board 6 is connected to the flexible printed circuit board 7a, so that voltages and clock signals (control signals) outputted from the control board 6 are supplied to the scanning line driving circuit 4 and the auxiliary capacitor line driving circuit 5 via the flexible printed circuit board 7a.

In Embodiment 1, the control board 6 is connected to the flexible printed circuit board 7a. However, such an arrangement is not intended to limit the scope of the present invention. Alternatively, the control board 6 can be appropriately placed, in consideration of delay of a signal to be supplied, layout, etc.

Further, as described above, in Embodiment 1, the signal line driving circuit 3, the scanning line driving circuit 4, and the auxiliary capacitor line driving circuit 5 are mounted to the liquid crystal display panel 2 externally after the manufacture of the liquid crystal display panel 2. However, this is not intended to limit the scope of the present invention. If necessary, at least one of the signal line driving circuit 3, the scanning line driving circuit 4, and the auxiliary capacitor line driving circuit 5 can be formed monolithically with the TFTs provided in the display region R1, details of which will be described later.

Figure 1:
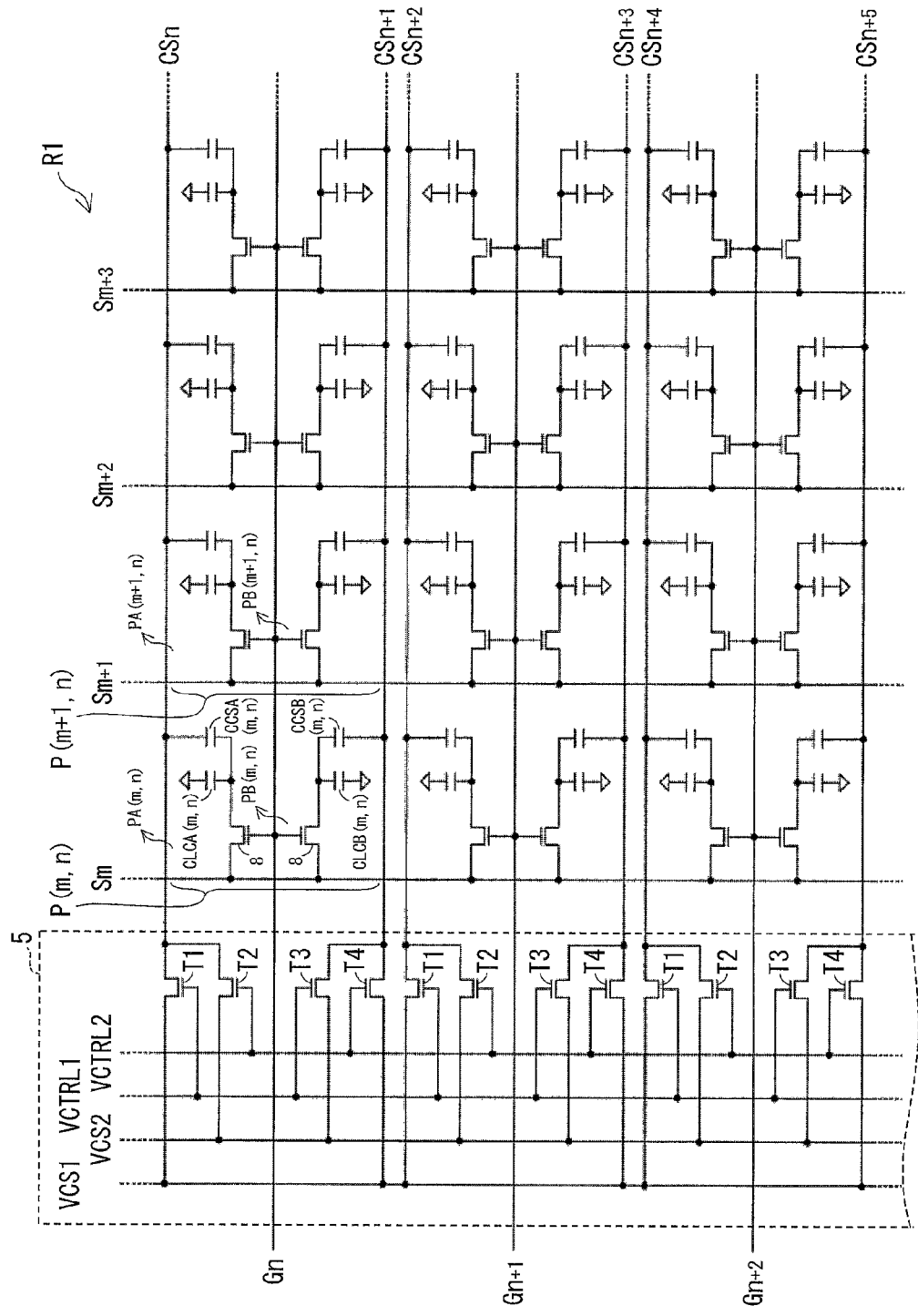
FIG. 1

The following will describe details of (i) the display region R1 provided in the liquid crystal display panel 2 and (ii) the auxiliary capacitor line driving circuit 5, with reference to FIG. 1.

FIG. 1 is a diagram schematically showing part of an equivalent circuit of (i) the display region R1 provided in the liquid crystal display panel 2 and (ii) the auxiliary capacitor line driving circuit 5, both of which are shown FIG. 4.

Note that in FIG. 1 the flexible printed circuit board 7*b* is omitted.

As shown in FIG. 1, the display region R1 of the liquid crystal display panel 2 has picture elements P(m, n), P(m+1, n), and the like formed therein and arranged in a matrix manner in a plurality of column directions and in a plurality of row directions. Each of the picture elements has two sub-picture elements aligned in a row direction. For example, the picture element P(m, n) has two sub-picture elements PA(m, n) and PB(m, n) aligned in the row direction.

Further, each of the sub-picture elements has a liquid crystal capacitor and an auxiliary capacitor (auxiliary capacitor element). For example, a sub-picture element PA(m, n) has a liquid crystal capacitor CLCA(m, n) and an auxiliary capacitor CCSA(m, n).

The liquid crystal capacitor is constituted by a sub-picture element electrode connected to a drain electrode of a TFT 8 (active element), a counter electrode, and a liquid crystal layer provided between the sub-picture element electrode and the counter electrode. Meanwhile, the auxiliary capacitor is constituted by an auxiliary capacitor electrode connected to the drain electrode of the TFT 8, an insulating layer, and an auxiliary-capacitor counter electrode connected to the auxiliary capacitor line (CSn, CSn+1, or the like).

To each of the sub-picture elements is provided the TFT 8. For example, two sub-picture elements PA(m, n) and PB (m, n) are connected to a common signal line Sm and a common scanning line Gn via the TFTs 8 which are provided respectively to the sub-picture elements PA(m, n) and PB (m, n).

The TFTs 8 provided respectively to the two sub-picture elements PA(m, n) and PB(m, n) are controlled simultaneously by a scan signal supplied to the common scanning line Gn. When the two TFTs 8 are in a on-state, data signal is supplied from the common signal line Sm to both the sub-picture element electrode and auxiliary capacitor electrode provided to each of the two sub-picture elements PA(m, n) and PB(m, n).

Further, the auxiliary-capacitor counter electrodes of the respective sub-picture elements PA(m, n) and PB(m, n) are connected to the auxiliary capacitor line driving circuit 5 via both the auxiliary capacitor line CSn and the auxiliary capacitor line CSn+1.

As shown in FIG. 1, the auxiliary capacitor line driving circuit 5 includes a group of TFTs (T1, T2, T3, and T4) and a group of four trunk lines (VCS1, VCS2, VCTRL1, and VCTRL2) which are connected, in an electrically independent manner, to source electrodes and gate electrodes of the respective TFTs in the TFT group (switching elements and semiconductor elements).

Note that the TFTs (T1, T2, T3, and T4) can be formed from a metal-oxide semiconductor, for example. However, this is not intended to limit the present invention. Alternatively, each of the TFTs (T1, T2, T3, and T4) can be formed from a semiconductor layer including a nitride film or the like, instead of an oxide film included in the metal-oxide semiconductor.

To the auxiliary capacitor line CSn for the sub-picture element PA(m, n) shown in FIG. 1 is connected drain electrodes of the TFTs (T1 and T2). To a source electrode and a gate electrode of the TFT (T1) are connected the trunk line VCS1 (first voltage trunk line) and the trunk line VCTRL1 (control signal line), respectively. To a source electrode and a gate electrode of the TFT (T2) are connected the trunk line VCS2 (second voltage trunk line) and the trunk line VCTRL2 (control signal line), respectively.

On the other hand, to the auxiliary capacitor line CSn+1 for the sub-picture element PB(m, n) shown in FIG. 1 is connected drain electrodes of the TFTs (T3 and T4). To a source electrode and a gate electrode of the TFT (T3) are connected the trunk line VCS2 and the trunk line VCTRL1, respectively. To a source electrode and a gate electrode of the TFT (T4) are connected the trunk line VCS1 and the trunk line VCTRL2, respectively.

Figure 2:
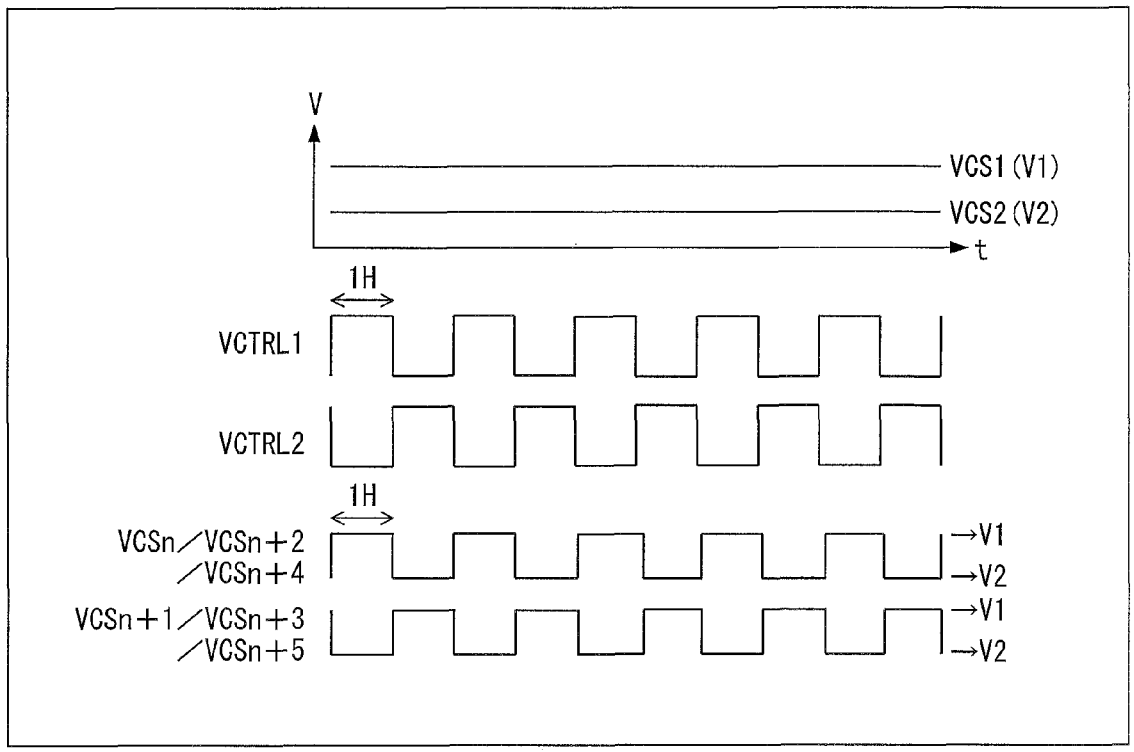
FIG. 2

FIG. 2 is a view showing a profile of dc voltages V1 and V2 supplied to the trunk lines VCS1 and VCS2, respectively, waveforms of control signals (clock signals) supplied to the trunk lines VCTRL1 and VCTRL2, respectively, and waveforms of voltages supplied to the auxiliary capacitor lines CSn, CSn+1, and the like, in the liquid crystal display device 1 according to an embodiment of the present invention.

To the trunk lines VCS1 and VCS2, respectively, the dc voltages V1 and V2 are supplied from the control board 6 shown in FIG. 4.

As shown in FIG. 2, the dc voltage V1 supplied to the trunk line VCS1 is set to be larger than the dc voltage V2 supplied to the trunk line VCS2.

Further, to the trunk lines VCTRL1 and VCTRL2, respectively, the control signals VCTRL1 and VCTRL2, each of which controls the auxiliary capacitor line driving circuit 5 and repeatedly alternates High and Low levels in a given cycle, are supplied from the control board 6.

Note that High voltage levels of the control signals VCTRL1 and VCTRL2 are set to be higher than the dc voltage V1, and the Low voltage levels of the control signals VCTRL1 and VCTRL2 are set to be lower than the dc voltage V2.

Note that in Embodiment 1, as shown in FIG. 1, all of the TFTs (T1, T2, T3, and T4) provided in the auxiliary capacitor line driving circuit 5 are realized by N-channel TFTs (N-type semiconductor elements). However, this is not intended to limit the present invention. Alternatively, the TFTs (T1, T2, T3, and T4) can be realized by P-channel TFTs (P-type semiconductor elements).

Furthermore, the TFTs (T1, T2, T3, and T4) can be realized by N-channel TFTs and P-channel TFTs in combination. Such an arrangement will be described in detail in Embodiment 3.

As shown in FIG. 2, in Embodiment 1, the control signals VCTRL1 and VCTRL2, each of which repeatedly alternates High and Low levels every 1 horizontal scanning period (1H) in such a manner that the control signals VCTRL1 and VCTRL2 do not go High simultaneously, are supplied to the trunk lines VCTRL1 and VCTRL2, respectively. More specifically, the controls signals VCTRL1 and VCTRL2, which are identical in vibration period and are out of phase by a half period (1H) with each other, are supplied to the trunk lines VCTRL1 and VCTRL2, respectively.

In Embodiment 1, all of the TFTs (T1, T2, T3, and T4) provided in the auxiliary capacitor line driving circuit 5 are realized by N-channel TFTs, as described above. Therefore, when the control signal VCTRL1 supplied to the trunk line VCTRL1 goes High, the TFTs (T1 and T3) are turned on (in a conductive state), so that the voltage V1 supplied to the trunk line VCS1 and the voltage V2 supplied to the trunk line VCS2 are supplied to the auxiliary capacitor lines CSn and CSn+1, respectively.

On the other hand, when the control signal VCTRL2 supplied to the trunk line VCTRL2 goes High, the TFTs (T2 and T4) are turned on, so that the voltage V2 supplied to the trunk line VCS2 and the voltage V1 supplied to the trunk line VCS1 are supplied to the auxiliary capacitor lines CSn and CSn+1, respectively.

Therefore, as shown in FIG. 2, to the auxiliary capacitor lines CSn, CSn+1, CSn+2, CSn+3, CSn+4, CSn+5, and the like, are supplied voltages corresponding to the wavelengths of the control signals VCTRL1 and VCTRL2 supplied to the trunk lines VCTRL1 and VCTRL2.

Note that under circumstances where all of the TFTs (T1, T2. T3, and T4) shown in FIG. 1 are realized by P-channel TFTs, when the control signal VCTRL1 supplied to the trunk line VCTRL1 goes Low, the TFTs (T1 and T3) are turned on, so that the voltage V1 supplied to the trunk line VCS1 and the voltage V2 supplied to the trunk line VCS2 are supplied to the auxiliary capacitor lines CSn and CSn+1, respectively (not shown).

On the other hand, when the control signal VCTRL2 supplied to the trunk line VCTRL2 goes Low, the TFTs (T2 and T4) are turned on, so that the voltage V2 supplied to the trunk line VCS2 and the voltage V1 supplied to the trunk line VCS1 are supplied to the auxiliary capacitor lines CSn and CSn+1, respectively.

Therefore, under circumstances where all of the TFTs (T1, T2, T3, and T4) are realized by P-channel TFTs, voltages being opposite in polarity respectively to the control signals VCTRL1 and VCTRL2 supplied to the trunk lines VCTRL1 and VCTRL2 are supplied to the auxiliary capacitor lines CSn, CSn+1, CSn+2, CSn+3, CSn+4, CSn+5, and the like.

Figure 3:
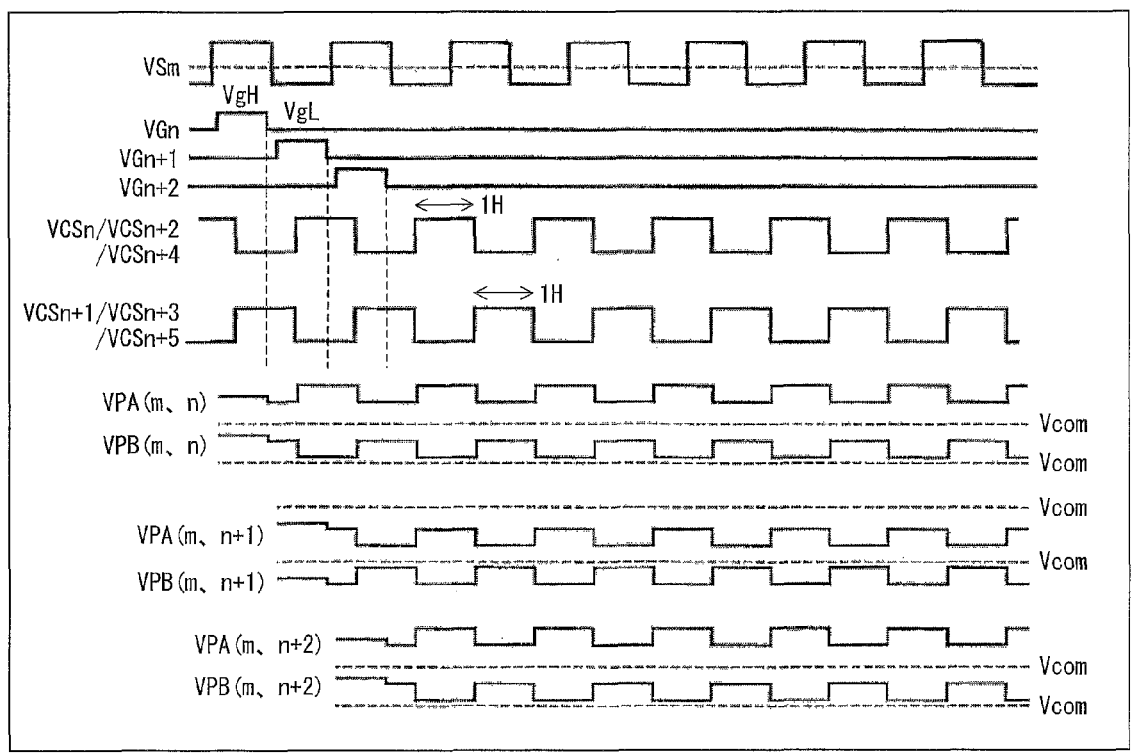
FIG. 3

FIG. 3 is a view showing waveforms of voltages supplied to the auxiliary capacitor lines with reference to a voltage waveform of the scanning line Gn and voltages of the sub-picture element electrodes, in the liquid crystal display device 1 according to an embodiment of the present invention.

Note that in Embodiment 1, the liquid crystal display device 1 is allowed to carry out 1H dot reversal driving, and the following descriptions will therefore assume that 1H dot reversal driving is carried out. However, the present invention is not limited to 1H dot reversal driving. Alternatively, for example, line reversal driving (1H line reversal driving, 2H line reversal driving, . . . n–H line reversal driving) may be carried out.

VSm denotes a waveform of a data signal voltage supplied to the signal line Sm. VGn, VGn+1, and VGn+2 denote voltage waveforms of scan signals supplied to the scanning line Gn, the scanning line Gn+1, and the scanning line Gn+2, respectively.

Further, in Embodiment 1, as shown in FIG. 3, a time in the middle of a flat part of the voltage V2 of the VCSn described above is set so as to be identical with a time at the transition of VGn from VgH(High) to VgL(Low). Meanwhile, a time in the middle of a flat part of the voltage V1 of the VCSn+1 described above is set so as to be identical with the time at the transition of VGn from VgH(High) to VgL(Low).

Still further, a time in the middle of the flat part of the voltage V1 of the VCSn+2 is set so as to be identical with a time at the transition of VGn+1 from VgH(High) to VgL (Low). Meanwhile, a time in the middle of the flat part of the voltage V2 of the VCSn+3 is set so as to be identical with the time at the transition of VGn+1 from VgH(High) to VgL (Low).

Yet further, a time in the middle of the flat part of the voltage V2 of the VCSn+4 is set so as to be identical with a time at the transition of VGn+2 from VgH(High) to VgL (Low). Meanwhile, a time in the middle of the flat part of the voltage V1 of the VCSn+5 is set so as to be identical with the time at the transition of VGn+2 from VgH(High) to VgL (Low).

That is, in Embodiment 1, a time from the transition of VGn from VgH(High) to VgL(Low) to the change of the voltage VCSn is set to be 0.5 H (0.5 horizontal period). However, this is not intended to limit the present invention. From the viewpoint of allowing the auxiliary capacitors to be more effectively driven, the time from the transition of VGn from VgH (High) to VgL(Low) to the change of the voltage VCSn is preferably shorter within the bounds where the time at the transition of VGn from VgH(High) to VgL(Low) does not overlap the time at the change of the voltage VCSn.

In Embodiment 1 in which the liquid crystal display device 1 is allowed to carry out 1H dot reversal driving, the voltage of the sub-picture element electrode in the sub-picture element PA(m, n) shown in FIG. 1 takes a voltage waveform indicated by VPA(m, n) in FIG. 3. Meanwhile, the voltage of the sub-picture element electrode in the sub-picture element PB(m, n) shown in FIG. 1 takes a voltage waveform indicated by VPB(m, n) in FIG. 3. Consequently, the sub-picture element PA(m, n) becomes a bright picture element, and the sub-picture element PB(m, n) becomes a dark picture element.

Further, as shown in FIG. 3, the voltage of the sub-picture element electrode in the sub-picture element PA(m, n+1) shown in FIG. 1 takes a voltage waveform indicated by VPA (m, n+1) in FIG. 3. Meanwhile, the voltage of the sub-picture element electrode in the sub-picture element PB(m, n+1) shown in FIG. 1 takes a voltage waveform indicated by VPB (m, n+1) in FIG. 3. Consequently, the sub-picture element PA(m, n+1) becomes a bright picture element, and the sub-picture element PB(m, n+1) becomes a dark picture element.

Still further, as shown in FIG. 3, the voltage of the sub-picture element electrode in the sub-picture element PA(m, n+2) shown in FIG. 1 takes a voltage waveform indicated by VPA(m, n+2) in FIG. 3. Meanwhile, the voltage of the sub-picture element electrode in the sub-picture element PB(m, n+2) shown in FIG. 1 takes a voltage waveform indicated by VPB(m, n+2) in FIG. 3. Consequently, the sub-picture element PA(m, n+2) becomes a bright picture element, and the sub-picture element PB(m, n+2) becomes a dark picture element.

As described above, the liquid crystal display device 1 in Embodiment 1 is allowed to carry out 1H dot reversal driving. Therefore, the sub-picture elements adjacent to one another in the row direction are alternating bright and dark picture elements.

In addition, the data signal voltage VSm+1 supplied to the signal line Sm+1 is opposite in polarity to the data signal voltage VSm supplied to the signal line Sm (not shown), and adjacent sub-picture elements aligned in the column direction are alternating bright and dark picture elements.

Further, the data signal voltages VSm, VSm+1, and the like are supplied to the signal lines Sm, Sm+1, and the like so that voltages of the sub-picture elements connected to the signal lines Sm, Sm+1, and the like are made their polarities reversed every 1 vertical scanning period (1V).

As described above, the liquid crystal display device 1 according to Embodiment 1 is configured, as shown in FIGS. 1 and 4, such that the auxiliary capacitor line driving circuit 5, which supplies auxiliary capacitor driving signals (vibration voltages and periodic voltages) to the auxiliary capacitor lines CSn, CSn+1, CSn+2, CSn+3, CSn+4, CSn+5, and the like, is provided right near the display region R1 of the liquid crystal display panel 2.

On the other hand, the conventional configuration is such that the auxiliary capacitor line driving circuit which supplies the auxiliary capacitor driving signals to the auxiliary capacitor lines is provided outside the liquid crystal display panel, and the auxiliary capacitor driving signals are supplied from the auxiliary capacitor line driving circuit to the auxiliary capacitor lines via auxiliary capacitor trunk lines which are provided in the liquid crystal display panel.

In the above-described conventional configuration, the auxiliary capacitor line driving circuit is provided outside the liquid crystal display panel. This configuration is always accompanied by the problem of signal delay particularly in a large liquid crystal display device. One remedy for the problem of signal delay can be broadening of pulse widths of the auxiliary capacitor driving signals to be supplied to the auxiliary capacitor lines. This, however, increases the type of required auxiliary capacitor driving signals and increases the number of auxiliary capacitor trunk lines.

Consequently, the above-described conventional configuration results in an increased picture frame region of the liquid crystal display device where there are provided (i) the control board (external circuit board) that generates the required auxiliary capacitor driving signals in large number and (ii) the auxiliary capacitor trunk lines.

Further, broadening the line widths of the auxiliary capacitor trunk lines to reduce resistance (load) further increases the frame region of the liquid crystal display device where the auxiliary capacitor trunk lines are provided.

On the contrary, the liquid crystal display device 1 according to Embodiment 1 is such that the auxiliary capacitor line driving circuit 5 is provided right near the display region R1 of the liquid crystal display panel 2, and a signal supplied from the outside of the liquid crystal display panel 2 to the auxiliary capacitor line driving circuit 5 is not the auxiliary capacitor driving signal but rather a control signal for driving the auxiliary capacitor line driving circuit. Such a configuration greatly alleviates the above-described signal delay.

This eliminates the need for broadening the pulse widths of the auxiliary capacitor driving signals supplied to the auxiliary capacitor lines. This is not accompanied by increase in the type of required auxiliary capacitor driving signals and increase of the number of auxiliary capacitor lines driven in an electrically independent manner.

The conventional configuration requires provision of about ten auxiliary capacitor trunk lines to avoid the above-described signal delay. On the other hand, the liquid crystal display device 1 according to Embodiment 1 needs only to provide the trunk lines VCS1 and VCS2 for carrying dc voltages and the trunk lines VCTRL1 and VCTRL2 for carrying control signals. This allows significant reduction of the number of trunk lines to be provided.

As shown in FIG. 1, since all of the TFTs (T1, T2, T3, and T4) are realized by N-channel TFTs in Embodiment 1, two kinds of trunk lines (trunk lines VCTRL1 and VCTRL2) need to be provided for carrying the control signals. Alternatively, only one type of trunk line may be provided when the configuration in Embodiment 3 later described is employed.

According to the above configuration, the auxiliary capacitor line driving circuit 5 is provided in the liquid crystal display panel 2. This makes it possible to reduce the size of the control board 6, as compared to the conventional configuration.

Therefore, it is possible to achieve a liquid crystal display device 1 that enables narrowing of a picture frame region as a non-display region and the control board 6.

In addition, according to the above-described configuration, it is possible to reduce the number of output signals from the control board 6. This makes it possible to reduce the cost of parts of the control board 6, thus enabling provision of the liquid crystal display device 1 with reduced manufacturing cost.

Note that in Embodiment 1, as shown in FIG. 1, a pair of TFTs are connected to each of the auxiliary capacitor lines CSn, CSn+1, CSn+2, and the like. More specifically, the TFTs (T1 and T2) are connected to the auxiliary capacitor lines CSn, CSn+2, and the like, and the TFTs (T3 and T4) are connected to the auxiliary capacitor lines CSn+1, CSn+3, and the like.

The present invention is not limited to the above-described configuration. An alternative configuration can be employed in which the TFTs (T1 and T2) can be shared among the plurality of auxiliary capacitor lines CSn, CSn+2, and the like, and the TFTs (T3 and T4) can be shared among the plurality of auxiliary capacitor lines CSn+1, CSn+3, and the like.

FIG. 5 is a diagram schematically showing part of an equivalent circuit of (i) a display region R1 provided in the liquid crystal display panel 2 and (ii) the auxiliary capacitor line driving circuit 5, both of which are shown in FIG. 4, in a case where the trunk lines VCS1 and VCS2 are placed so as to match each other.

As shown in FIG. 5, the trunk lines VCS1 and VCS2 are placed so as to match each other when viewed from a top of the liquid crystal display device, thereby producing decoupling capacitors. This makes it possible to prevent an unstable power supply.

Furthermore, by placing the trunk lines VCS1 and VCS2 so as to match each other, it is possible to further reduce a proportion of the area where a group of the trunk lines is formed in the liquid crystal display panel 2. This makes it possible to achieve further narrowing of the picture frame region as a non-display region.

In Embodiment 1, individual control signals (clock signals) are inputted to the scanning line driving circuit 4 and the auxiliary capacitor line driving circuit 5. Alternatively, the control signals (clock signals) inputted to the scanning line driving circuit 4 and the auxiliary capacitor line driving circuit 5 can be unified.

For example, a circuit that changes a voltage amplitude and a frequency of the control signal (clock signal) inputted to the scanning line driving circuit 4 as appropriate to generate a control signal (clock signal) for use in the auxiliary capacitor line driving circuit 5 is provided in the liquid crystal display panel 2. In this case, it is possible to realize an arrangement such that the control signal (clock signal) needs only to be inputted to the scanning line driving circuit 4 alone.

Alternatively, a circuit that changes a voltage amplitude and a frequency of the control signal (clock signal) inputted to the auxiliary capacitor line driving circuit 5 as appropriate to generate a control signal (clock signal) for use in the scanning line driving circuit 4 can be provided in the liquid crystal display panel 2. In this case, it is possible to realize an arrangement such that the control signal (clock signal) needs only to be inputted to the auxiliary capacitor line driving circuit 5 alone.

According to the above-described configuration, the control signals (clock signals) inputted to the scanning line driving circuit 4 and the auxiliary capacitor line driving circuit 5 can be unified, thereby reducing the number of trunk lines for carrying the control signals (clock signals). This makes it possible to achieve further narrowing of the picture frame region as a non-display region in the liquid crystal display device 1.

[Embodiment 2]

Next, with reference to FIGS. 6 through 8, Embodiment 2 of the present invention will be described. Embodiment 2 is different from Embodiment 1 in that in order to enhance an aperture ratio of a liquid crystal display device, each of the auxiliary capacitor lines is shared between the adjacent sub-picture elements in the liquid crystal display device according to Embodiment 1, but other arrangements are those as described in Embodiment 1. For the purpose of explanation, members having the same functions as those described in Embodiment 1 are given the same reference numerals and explanations thereof are omitted here.

Figure 6:
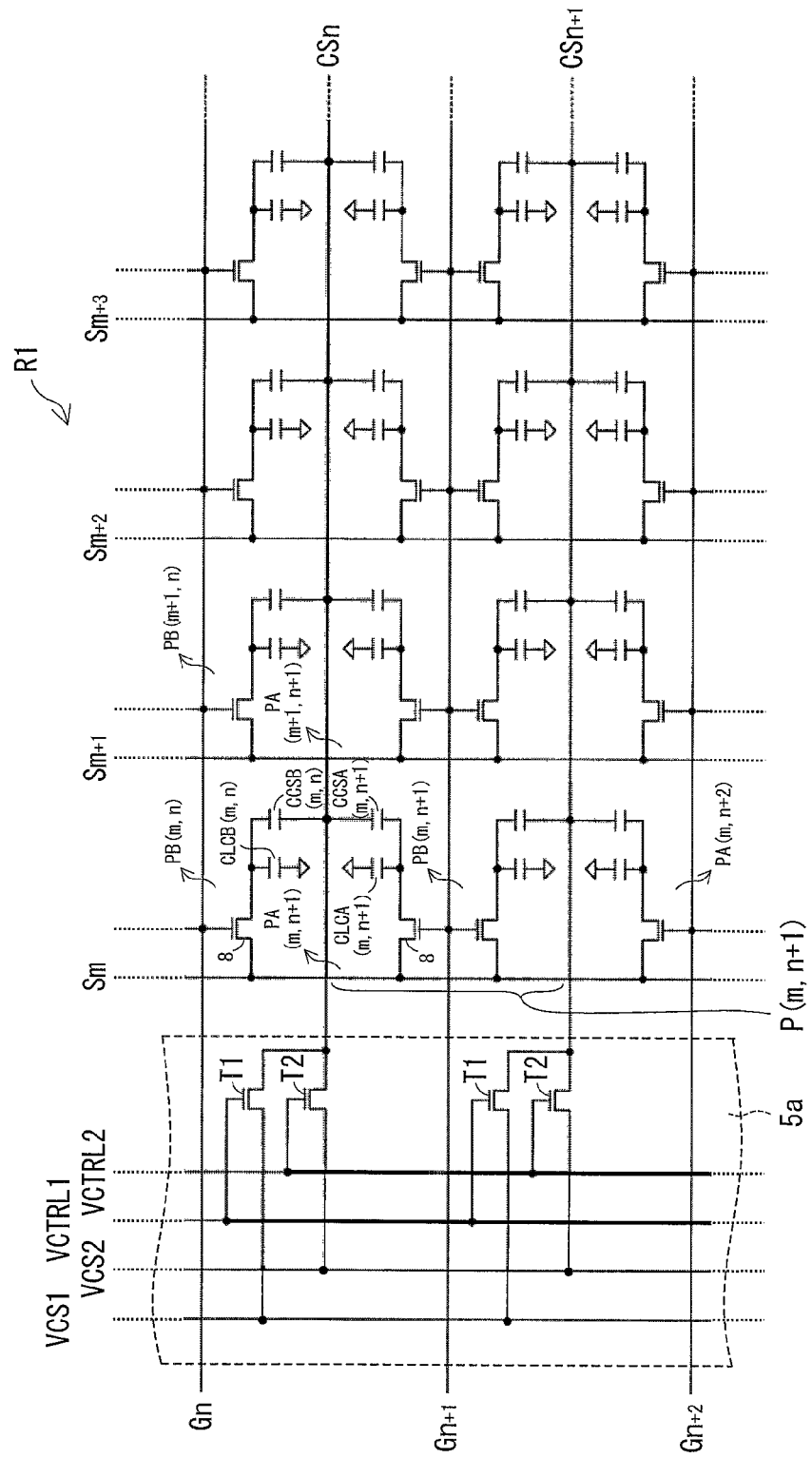
FIG. 6

FIG. 6 is a diagram schematically showing part of an equivalent circuit of (i) a display region R1 and (ii) an auxiliary capacitor line driving circuit 5a, both of which are provided in a liquid crystal display device according to Embodiment 2.

As shown in FIG. 6, an auxiliary capacitor line CSn is shared between a sub-picture element PB(m, n) and a sub-picture element PA(m, n+1), which are adjacent to each other in the row direction, and an auxiliary capacitor line CSn+1 is shared between a sub-picture element PB(m, n+1) and a sub-picture element PA(m, n+2), which are adjacent to each other in the row direction.

Such a configuration enables the reduction of an area required for the formation of the auxiliary capacitor lines, which area is a non-display region, in the sub-picture elements, thus enabling enhancement of the aperture ratio.

Figure 7:
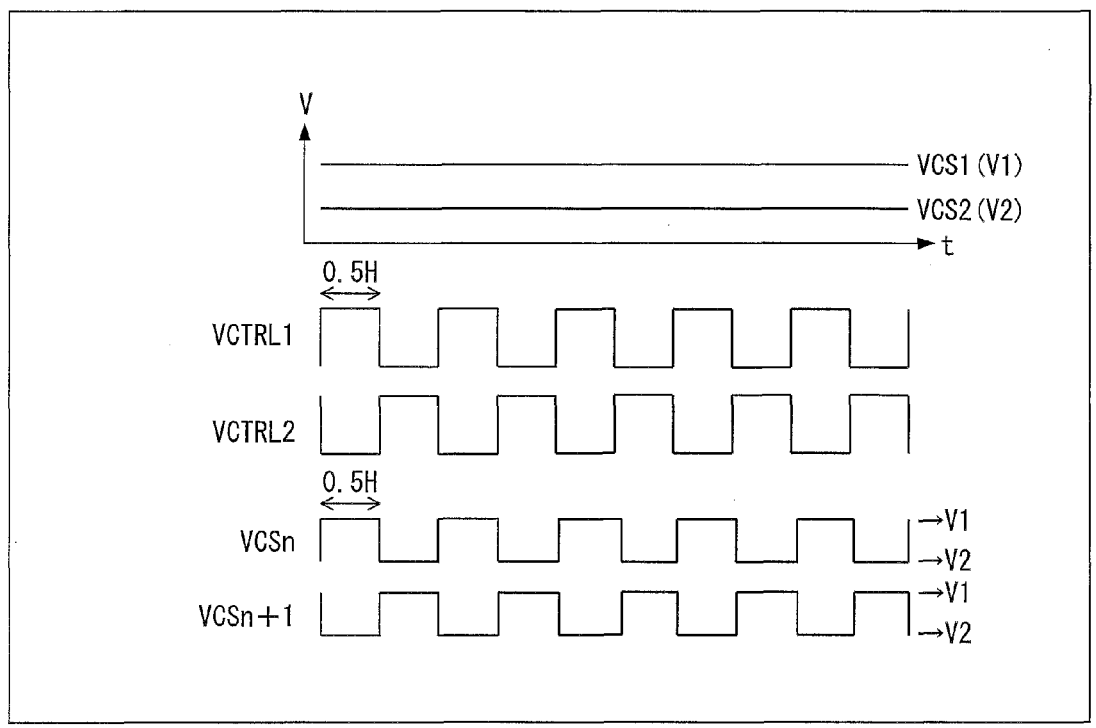
FIG. 7

FIG. 7 is a view showing dc voltages V1 and V2 supplied to the trunk lines VCS1 and VCS2, respectively, waveforms of control signals supplied to the trunk lines VCTRL1 and VCTRL2, respectively, and waveforms of voltages supplied to the auxiliary capacitor lines, in a liquid crystal display device of Embodiment 2.

To the trunk lines VCS1 and VCS2, respectively, the dc voltages V1 and V2 are supplied from the control board 6 shown in FIG. 4.

As shown in FIG. 7, the dc voltage V1 supplied to the trunk line VCS1 is set to be larger than the dc voltage V2 supplied to the trunk line VCS2.

Further, to the trunk lines VCTRL1 and VCTRL2, respectively, the control signals, each of which control the auxiliary capacitor line driving circuit 5a and repeatedly alternates High and Low levels in a given cycle, are supplied from the control board 6.

As shown in FIG. 7, in Embodiment 2, the control signals VCTRL1 and VCTRL2, each of which repeatedly alternates High and Low every 0.5 horizontal scanning period (0.5H) in such a manner that the control signals VCTRL1 and VCTRL2 do not go High simultaneously, are supplied to the trunk lines VCTRL1 and VCTRL2, respectively. More specifically, the controls signals VCTRL1 and VCTRL2, which are identical in vibration period and are out of phase by a half period (0.5H) with each other, are supplied to the trunk lines VCTRL1 and VCTRL2, respectively.

When the control signal supplied to the trunk line VCTRL1 goes High, the TFT (T1) is turned on, so that the voltage V1 to be supplied to the trunk line VCS1 is supplied to the auxiliary capacitor line CSn.

On the other hand, when the control signal supplied to the trunk line VCTRL2 goes High, the TFT (T2) is turned on, so that the voltage V2 to be supplied to the trunk line VCS2 is supplied to the auxiliary capacitor line CSn.

Therefore, as shown in FIG. 7, to the auxiliary capacitor lines CSn, CSn+1, and the like are supplied the voltages VCSn and VCSn+1 corresponding to the waveforms of the control signals supplied to the trunk lines VCTRL1 and VCTRL2.

Figure 8:
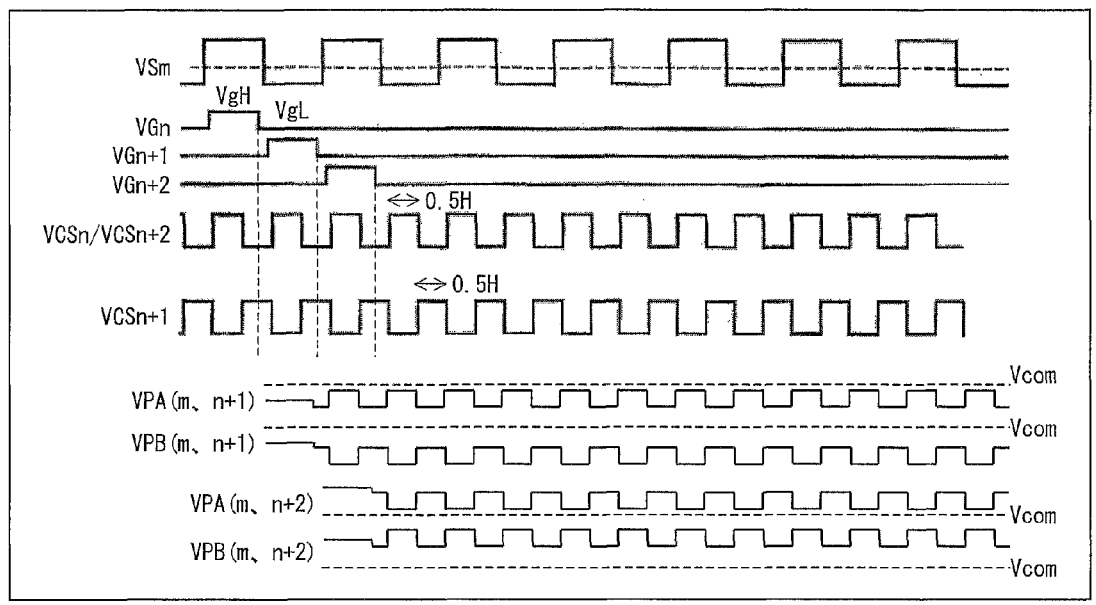
FIG. 8

FIG. 8 is a view showing waveforms of voltages supplied to the auxiliary capacitor lines and voltages of the sub-picture element electrodes, with reference to a voltage waveform of the scanning line Gn, in a liquid crystal display device according to still another embodiment of the present invention.

Note that the descriptions in Embodiment 2 also assume that 1H dot reversal driving is carried out.

VSm denotes a waveform of a display signal voltage supplied to the signal line Sm. VGn, VGn+1, and VGn+2 denote waveforms of voltages supplied to the scanning line Gn, the scanning line Gn+1, and the scanning line Gn+2, respectively.

Further, as shown in FIG. 8, a time in the middle of a flat part of the voltage V2 of the VCSn described above is set so as to be identical with a time at the transition of VGn from VgH to VgL. Meanwhile, a time in the middle of a flat part of the voltage V1 of the VCSn+1 described above is set so as to be identical with the time at the transition of VGn from VgH to VgL.

Still further, a time in the middle of the flat part of the voltage V1 of the VCSn+1 is set so as to be identical with a time at the transition of VGn+1 from VgH to VgL. Meanwhile, a time in the middle of the flat part of the voltage V2 of the VCSn+2 is set so as to be identical with the time at the transition of VGn+1 from VgH to VgL.

Therefore, the voltage of the sub-picture element electrode in the sub-picture element PA(m, n+1) shown in FIG. 8 takes the voltage waveform indicated by VPA(m, n+1). Meanwhile, the voltage of the sub-picture element electrode in the sub-picture element PB(m, n+1) takes the voltage waveform indicated by VPB(m, n+1). Consequently, the sub-picture element PA(m, n+1) becomes a dark picture element, and the sub-picture element PB(m, n+1) becomes a bright picture element.

Still further, as shown in FIG. 8, the voltage of the sub-picture element electrode in the sub-picture element PA(m, n+2) shown in FIG. 8 takes the voltage waveform indicated by VPA(m, n+2). Meanwhile, the voltage of the sub-picture element electrode in the sub-picture element PB(m, n+2) not shown in FIG. 6 takes the voltage waveform indicated by VPB(m, n+2). Consequently, the sub-picture element PA(m, n+2) becomes a dark picture element, and the sub-picture element PB(m, n+2) becomes a bright picture element.

As described above, the liquid crystal display device in Embodiment 2 is allowed to carry out 1H dot reversal driving. Therefore, the sub-picture elements adjacent to one another in the row direction are alternating bright and dark picture elements.

Note that in Embodiment 2, the liquid crystal display device 1 is allowed to carry out 1H dot reversal driving, and the controls signals VCTRL1 and VCTRL2, each of which repeatedly alternates High and Low levels every 0.5 horizontal scanning period in such a manner that the control signals VCTRL1 and VCTRL2 do not go High simultaneously, are supplied to the trunk lines VCTRL1 and VCTRL2, respectively. However, the present invention is not limited to 1H dot reversal driving. Alternatively, the liquid crystal display device 1 may be allowed to carry out, for example, line reversal driving (1H line reversal driving, 2H line reversal driving, . . . and nH line reversal driving).

[Embodiment 3]

Next, with reference to FIG. 9, Embodiment 3 of the present invention will be described. Embodiment 3 is different from Embodiment 1 in that the TFTs provided in the auxiliary capacitor line driving circuit 5 is configured to be combinations of P-channel TFTs and N-channel TFTs (complementary semiconductor elements), but other arrangements are those as described in Embodiment 1. For the purpose of explanation, members having the same functions as those described in Embodiment 1 are given the same reference numerals and explanations thereof are omitted here.

FIG. 9 is a diagram schematically showing part of an equivalent circuit of (i) a display region R1 and (ii) an auxiliary capacitor line driving circuit 5b, both of which are provided in a liquid crystal display device according to Embodiment 3.

As shown in FIG. 9, in the group of TFTs (T1, T2, T3, and T4) provided in the auxiliary capacitor line driving circuit 5b, the TFTs (T1 and T3) are realized by N-channel TFTs, whereas the TFTs (T2 and T4) are realized by P-channel TFTs.

Note that in Embodiment 3, the TFTs (T1 and T3) are realized by N-channel TFTs, whereas the TFTs (T2 and T4) are realized by P-channel TFTs. However, alternative arrangement may be adopted such that the TFTs (T1 and T3) are realized by P-channel TFTs, whereas the TFTs (T2 and T4) are realized by N-channel TFTs.

In Embodiment 3, as described above, in the group of the TFTs (T1, T2, T3, and T4) provided in the auxiliary capacitor line driving circuit 5b, the TFTs (T1 and T3) are realized by N-channel TFTs, whereas the TFTs (T2 and T4) are realized by P-channel TFTs. Therefore, when the control signal VCTRL supplied to the trunk line VCTRL is High, the TFT (T1) is turned on, and the TFT (T2) is turned off, so that the voltage V1 to be supplied to the trunk line VCS1 is supplied to the auxiliary capacitor line CSn.

Further, when the control signal VCTRL supplied to the trunk line VCTRL is High, the TFT (T3) is turned on, and the TFT (T4) is turned off, so that the voltage V2 to be supplied to the trunk line VCS2 is supplied to the auxiliary capacitor line CSn+1.

On the other hand, when the control signal VCTRL supplied to the trunk line VCTRL is Low, the TFT (T1) is turned off, and the TFT (T2) is turned on, so that the voltage V2 to be supplied to the trunk line VCS2 is supplied to the auxiliary capacitor line CSn.

Moreover, when the control signal VCTRL supplied to the trunk line VCTRL is Low, the TFT (T3) is turned off, and the TFT (T4) is turned on, so that the voltage V1 to be supplied to the trunk line VCS1 is supplied to the auxiliary capacitor line CSn+1.

Note that to the trunk line VCTRL is supplied the control signal VCTRL repeatedly alternating High and Low every 1 horizontal scanning period (1H).

According to the above-described configuration, by using the control signal VCTRL supplied to one trunk line VCTRL, the auxiliary capacitor driving signals can be supplied to the auxiliary capacitor lines CSn, CSn+1, CSn+2, CSn+3, CSn+4, CSn+5, and the like.

Thus, according to the above-described configuration, the number of trunk lines provided in the auxiliary capacitor line driving circuit 5b can be reduced. This makes it possible to achieve further narrowing of the picture frame region as the non-display region in the liquid crystal display device 1.

Note that in Embodiment 3 the control signal VCTRL supplied to one VCTRL trunk line is used. However, such a configuration is not intended to limit the present invention. Alternatively, to two trunk lines VCTRL can be supplied two control signals being identical in vibration period and being out of phase with each other so that a rise period of one of the control signals does not overlap a fall period of the other control signal.

Note that one of the two control signals is supplied to the N-channel TFTs provided in the complementary semiconductor elements, whereas the other control signal is supplied to the P-channel TFTs provided in the complementary semiconductor elements.

According to such an arrangement, the following can be achieved. That is, when the control signal to be supplied to the N-channel TFTs provided in the complementary semiconductor elements is rising, the N-channel TFTs provided in the complementary semiconductor elements allow both the trunk line VCS1 connected to the N-channel TFTs and the auxiliary capacitor lines CSn, CSn+1, and the like to be electrically conductive. In addition, when the control signal to be supplied to the P-channel TFTs provided in the complementary semiconductor elements is falling, the P-channel TFTs provided in the complementary semiconductor elements allow both the trunk line VCS2 connected to the P-channel TFTs and the auxiliary capacitor lines CSn, CSn+1, and the like to be electrically conductive.

[Embodiment 4]

Next, with reference to FIGS. 10 and 11, Embodiment 4 of the present invention will be described. Embodiment 4 is different from Embodiment 1 in that an auxiliary capacitor line driving circuit 5c has a pre-emphasis function, the so-called overshoot function (can carry out overshoot driving), but other arrangements are those as described in Embodiment 1. For the purpose of explanation, members having the same functions as those described in Embodiment 1 are given the same reference numerals and explanations thereof are omitted here.

Figure 10:
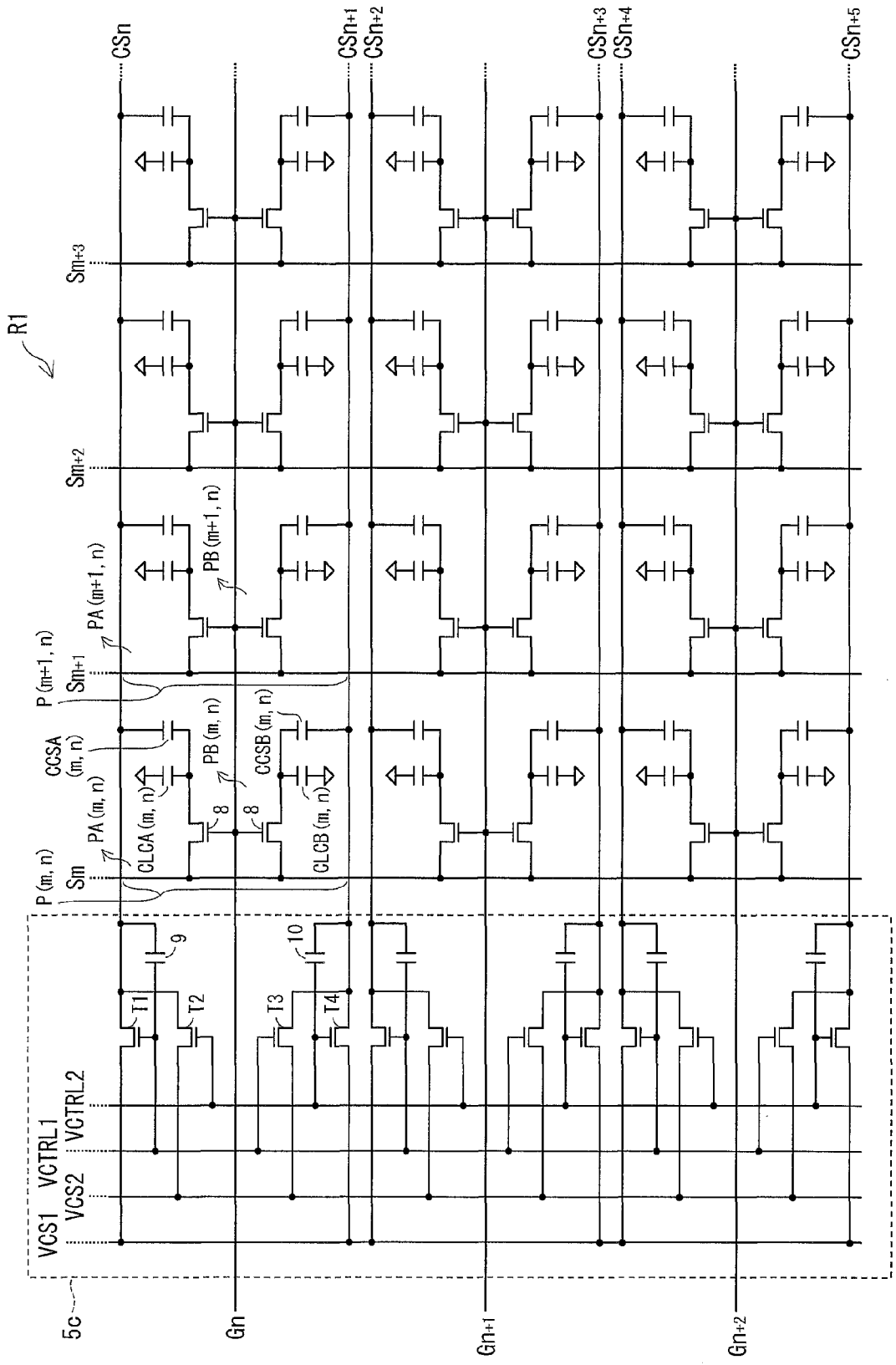
FIG. 10

FIG. 10 is a diagram schematically showing part of an equivalent circuit of (i) a display region R1 and (ii) an auxiliary capacitor line driving circuit 5c, both of which are provided in a liquid crystal display device according to Embodiment 4.

The auxiliary capacitor line driving circuit 5c shown in FIG. 10 includes not only the configuration of the auxiliary capacitor line driving circuit 5c shown in FIG. 1 but also the following configuration.

Capacitors 9 and 10 are provided. The capacitor 9 is connected to a gate electrode of the TFT (T1) at the one end thereof and connected to the auxiliary capacitor line CSn at the other end thereof. The capacitor 10 is connected to a gate electrode of the TFT (T4) at one end thereof and connected to the auxiliary capacitor line CSn+1 at the other end thereof.

The addition of the capacitors 9 and 10 enables obtaining of the following effect.

Note that in Embodiment 4 all of the TFTs (T1, T2, T3, and T4) provided in the auxiliary capacitor line driving circuit 5c are realized by N-channel TFTs.

First, the operation of the capacitor 9 will be described specifically.

When the control signal VCTRL1 goes High, the TFT (T1) is turned on, so that the voltage V1 fed to the trunk line VCS1 is supplied to each of the auxiliary capacitor lines CSn, CSn+2, CSn+4, and the like. The High level voltage of the voltage VCTRL1 is supplied to the one end of the capacitor 9 connected to the gate electrode of the TFT (T1), whereas the voltage V1 that is lower than the High level voltage of the voltage VCTRL1 is supplied to the other end of the capacitor 9 connected to each of the auxiliary capacitor lines CSn, CSn+2, CSn+4, and the like.

Such a configuration allows an increased voltage (High level voltage of the voltage VCTRL1) to be supplied to each of the auxiliary capacitor lines CSn, CSn+2, CSn+4, and the like of high resistance.

Thereafter, when the control signal VCTRL1 goes Low and the control signal VCTRL2 goes High, the TFT (T1) is turned off and the TFT (T2) is turned on.

Therefore, the voltage V2 fed to the trunk line VCS2 is supplied to the auxiliary capacitor lines CSn, CSn+2, CSn+4, and the like. The Low level voltage of the voltage VCTRL1 is supplied to the one end of the capacitor 9 connected to the gate electrode of the TFT (T1), whereas the voltage V2 that is higher than the Low level voltage of the voltage VCTRL1 is supplied to the other end of the capacitor 9 connected to each of the auxiliary capacitor lines CSn, CSn+2, CSn+4, and the like.

Such a configuration allows a decreased voltage (Low level voltage of the voltage VCTRL1) to be supplied to each of the auxiliary capacitor lines CSn, CSn+2, CSn+4, and the like of high resistance.

The following will specifically describe the operation of the capacitor 10.

When the control signal VCTRL2 goes High, the TFT (T4) is turned on, so that the voltage V1 fed to the trunk line VCS1 is supplied to each of the auxiliary capacitor lines CSn+1, CSn+3, CSn+5, and the like. The High level voltage of the voltage VCTRL2 is supplied to the one end of the capacitor 10 connected to the gate electrode of the TFT (T4), whereas the voltage V1 that is lower than the High level voltage of the voltage VCTRL2 is supplied to the other end of the capacitor 10 connected to each of the auxiliary capacitor lines CSn+1, CSn+3, CSn+5, and the like.

Such a configuration allows an increased voltage (High level voltage of the voltage VCTRL2) to be supplied to each of the auxiliary capacitor lines CSn+1, CSn+3, CSn+5, and the like of high resistance.

Thereafter, when the control signal VCTRL2 goes Low and the control signal VCTRL1 goes High, the TFT (T4) is turned off and the TFT (T3) is turned on.

Therefore, the voltage V2 fed to the trunk line VCS2 is supplied to the auxiliary capacitor lines CSn+1, CSn+3, CSn+5, and the like. The Low level voltage of the voltage VCTRL2 is supplied to the one end of the capacitor 10 connected to the gate electrode of the TFT (T4), whereas the voltage V2 that is higher than the Low level voltage of the voltage VCTRL2 is supplied to the other end of the capacitor 10 connected to each of the auxiliary capacitor lines CSn+1, CSn+3, CSn+5, and the like.

Such a configuration allows a decreased voltage (Low level voltage of the voltage VCTRL2) to be supplied to each of the auxiliary capacitor lines CSn+1, CSn+3, CSn+5, and the like of high resistance.

According to the above configuration, the effects of voltage increase and decrease can be given to the auxiliary capacitor lines CSn, CSn+1, CSn+2, and the like. This enables improvement of signal distortion caused by the signal delay at the rise and fall of the signals.

Figure 11:
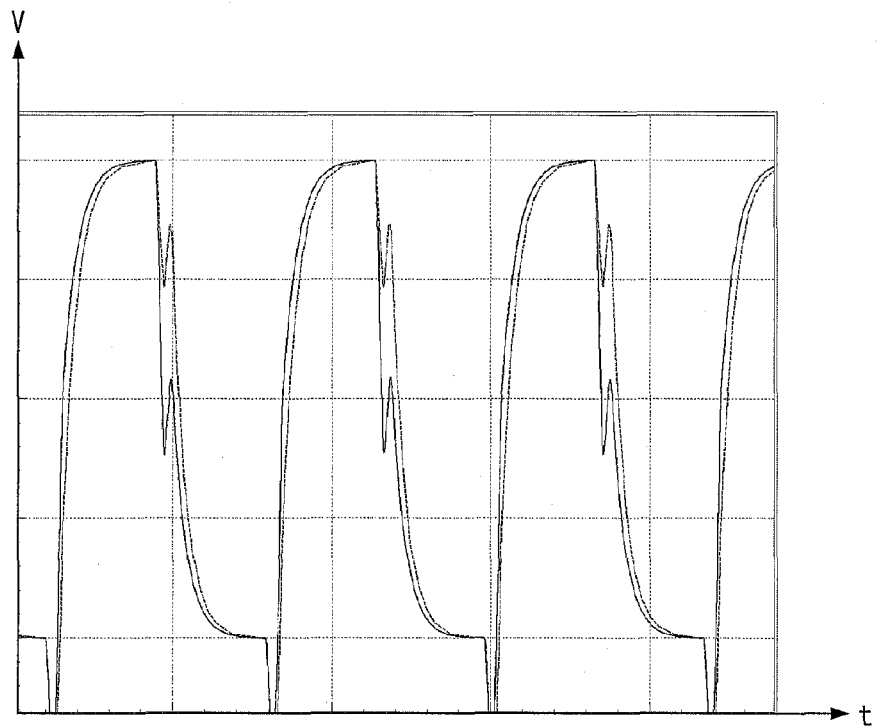
FIG. 11

FIG. 11 is a view showing an auxiliary capacitor driving signal generated by the auxiliary capacitor line driving circuit 5c which has the pre-emphasis function and an auxiliary capacitor driving signal generated by the auxiliary capacitor line driving circuit 5 which does not have the pre-emphasis function.

In FIG. 11, a solid line indicates the auxiliary capacitor driving signal generated by the auxiliary capacitor line driving circuit 5c which has the pre-emphasis function, and a dashed line indicates the auxiliary capacitor driving signal generated by the auxiliary capacitor line driving circuit 5 which does not have the pre-emphasis function.

As shown in FIG. 11, the auxiliary capacitor driving signal generated by the auxiliary capacitor line driving circuit 5c which has the pre-emphasis function, improves signal distortion on the rising edge due to the signal delay, as compared to the auxiliary capacitor driving signal generated by the auxiliary capacitor line driving circuit 5 which does not have the pre-emphasis function.

As described above, the auxiliary capacitor line driving circuit 5c has the pre-emphasis function, the so-called overshoot function. This makes it possible to reduce a time required to charge the auxiliary capacitors connected to the auxiliary capacitor lines CSn, CSn+1, and the like which are provided respectively for the sub-picture elements, without the need for addition of externally supplied signals. This makes it possible to quickly achieve driving of a plurality of sub-picture elements.

Further, even when the driving time is shortened due to increase in number of scanning lines, it is possible to prevent luminance unevenness and display variations.

Note that in Embodiment 4, since the voltage V1 supplied to the trunk line VCS1 is set to be higher than the voltage V2 supplied to the trunk line VCS2, the capacitor 9 is provided between the gate electrode of the TFT (T1) having the source electrode electrically connected to the trunk line VCS1 and the auxiliary capacitor line CSn, and the capacitor 10 is provided between the gate electrode of the TFT (T4) having the source electrode electrically connected to the trunk line VCS1 and the auxiliary capacitor line CSn+1. However, this configuration is not the only possibility. Alternatively, the following configuration can be employed.

For example, assume that the voltage V2 supplied to the trunk line VCS2 is set to be higher than the voltage V1 supplied to the trunk line VCS2. In this case, the capacitor 9 should be provided between the gate electrode of the TFT (T2) having the source electrode electrically connected to the trunk line VCS2 and the auxiliary capacitor line CSn, and the capacitor 10 should be provided between the gate electrode of the TFT (T3) having the source electrode electrically connected to the trunk line VCS2 and the auxiliary capacitor line CSn+1.

As described above, the above-described effect can be obtained by provision of the capacitors 9 and 10 closer to the TFTs supplying a higher voltage to the auxiliary capacitor lines CSn, CSn+1, and the like when the control signals VCTRL1 and VCTRL2 change to High.

Further, Embodiment 4 have been described taking, as an example, the auxiliary capacitor line driving circuit 5c including N-channel TFTs. However, this is not intended to limit the present invention. The use of the P-channel TFTs alone, the combination of P-channel TFTs and N-channel TFTs, and other arrangements can also yield the above-described effect.

The following will describe an auxiliary capacitor line driving circuit including P-channel TFTs (although not shown).

In the auxiliary capacitor line driving circuit including P-channel TFTs, the trunk line VCS1 is connected to each of the auxiliary capacitor lines CSn, CSn+1, and the like via first P-channel TFTs, and the trunk line VCS2 is connected to each of the auxiliary capacitor lines CSn, CSn+1, and the like via second P-channel TFTs.

To the first P-channel TFTs is supplied, for example, one of two control signals being identical in vibration period and being out of phase with each other so as not to fall simultaneously, and the other control signal is supplied to the second P-channel TFTs.

According to such a configuration, when the control signal supplied to the first P-channel TFTs is falling, the first P-channel TFTs allow both the trunk line VCS1 and the auxiliary capacitor lines CSn, CSn+1, and the like to be electrically conductive. On the other hand, when the control signal supplied to the second P-channel TFTs is falling, the second P-channel TFTs allow both the trunk line VCS2 and the auxiliary capacitor lines CSn, CSn+1, and the like to be electrically conductive.

Further, the voltage at the rise of the control signals is set to be higher than any voltages supplied to the trunk lines VCS1 and VCS2, and the voltage at the fall of the control signals is set to be lower than any voltages supplied to the trunk lines VCS1 and VCS2.

In addition, when the voltage supplied to the trunk line VCS1 is higher than the voltage supplied to the trunk line VCS2, the control signal line supplying the control signal to the second P-channel TFTs is connected via capacitors to the auxiliary capacitor lines CSn, CSn+1, and the like connected to the second P-channel TFTs. When the voltage supplied to the trunk line VCS2 is higher than the voltage supplied to the trunk line VCS1, the control signal line supplying the control signal to the first P-channel TFTs is connected via capacitors to the auxiliary capacitor lines CSn, CSn+1, and the like connected to the first P-channel TFTs.

As described above, in the auxiliary capacitor line driving circuit including the P-channel TFTs, the above-described effect can be obtained by provision of the capacities closer to the TFTs supplying a lower voltage to the auxiliary capacitor lines CSn, CSn+1, and the like when the control signal changes to Low.

The following will describe an auxiliary capacitor line driving circuit including complementary semiconductor elements which are combinations of P-channel TFTs and N-channel TFTs (although not shown).

In the auxiliary capacitor line driving circuit including the complementary semiconductor elements, the trunk line VCS1 is connected to the auxiliary capacitor lines CSn, CSn+1, and the like via the N-channel TFTs of the complementary semiconductor elements, and the trunk line VCS2 is connected to the auxiliary capacitor lines CSn, CSn+1, and the like via the P-channel TFTs of the complementary semiconductor elements.

To the N-channel TFTs provided in the complementary semiconductor elements is supplied one of two control signals being identical in vibration period and being out of phase with each other so that a rise period of one of the control signals does not overlap a fall period of the other control signal, and the other control signal is supplied to the P-channel TFTs provided in the complementary semiconductor elements.

According to such a configuration, when the control signal supplied to the N-channel TFTs of the complementary semiconductor elements is rising, the N-channel TFTs of the complementary semiconductor elements allow both the trunk line VCS1 connected to the N-channel TFTs and the auxiliary capacitor lines CSn, CSn+1, and the like to be electrically conductive. On the other hand, when the control signal supplied to the P-channel TFTs of the complementary semiconductor elements is falling, the P-channel TFTs of the complementary semiconductor elements allow both the trunk line VCS2 connected to the P-channel TFTs and the auxiliary capacitor lines CSn, CSn+1, and the like to be electrically conductive.

Further, the voltage at the rise of the control signals is set to be higher than any voltages supplied to the trunk lines VCS1 and VCS2, and the voltage at the fall of the control signals is set to be lower than any voltages supplied to the trunk lines VCS1 and VCS2.

In addition, the voltage supplied to the trunk line VCS1 is set to be higher than the voltage supplied to the trunk line VCS2. The control signal line supplying the control signal to one type of the semiconductor elements provided in the complementary semiconductor elements is connected via capacitors to the auxiliary capacitor lines CSn, CSn+1, and the like which are connected to the one type of the semiconductor elements provided in the complementary semiconductor elements.

As described above, in the auxiliary capacitor line driving circuit including the complementary semiconductor elements, the above-described effect can be obtained by provision of the capacities closer to the TFTs supplying a higher voltage to the auxiliary capacitor lines CSn, CSn+1, and the like when the control signal is High or closer to the TFTs supplying a lower voltage to auxiliary capacitor lines CSn, CSn+1, and the like when the control signal is Low.

[Embodiment 5]

Next, with reference to FIGS. 12 and 13, Embodiment 5 of the present invention will be described. Embodiment 5 is different from Embodiment 1 in that a duty ratio of a control signal (clock signal) supplied to an auxiliary capacitor line driving circuit in Embodiment 5 is different from a duty ratio of the control signal (clock signal) used in Embodiment 1, but other arrangements are those as described in Embodiment 1. For the purpose of explanation, members having the same functions as those described in Embodiment 1 are given the same reference numerals and explanations thereof are omitted here.

With regard to a TFT including an amorphous silicon layer (a-Si layer) that is an amorphous semiconductor layer, it is known that deterioration in characteristics of the TFT (variations of a threshold value Vth) occurs when a gate electrode of the TFT is under a voltage stress.

In addition, it is known that a coefficient of the deterioration (variations of the threshold value Vth) varies in its absolute value with respect to stress of a positive voltage and stress of a negative voltage, both of which are opposite in polarity, and that the deterioration (variations of the threshold value Vth) becomes more severe under the positive voltage stress.

In view of this, in Embodiment 5, a control signal (clock signal) having a duty ratio of less than 1/2 is supplied to the auxiliary capacitor line driving circuit, so that a time for the positive voltage stress is less than a time for the negative voltage stress, and the characteristics of the TFTs provided in the auxiliary capacitor line driving circuit can be thus prevented from being deteriorated.

Note that the duty ratio is a ratio of (an area of a rising region of the control signal) to (the area of the rising region of the control signal and an area of a falling region of the control signal) in one cycle of the control signal.

Figure 12:
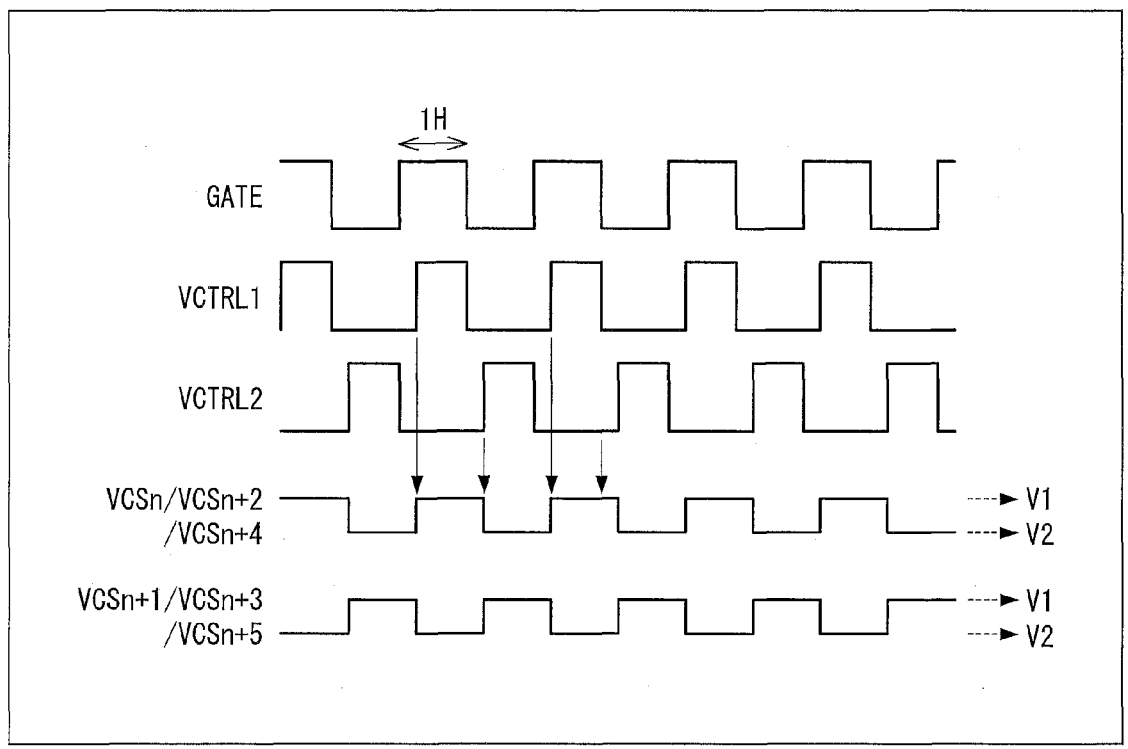
FIG. 12

FIG. 12 is a view showing waveforms of control signals (clock signals) supplied to the trunk lines VCTRL1 and VCTRL2 with reference to a gate clock and waveforms of voltages supplied to the auxiliary capacitor lines CSn, CSn+1, and the like, in a liquid crystal display device according to Embodiment 5.

In FIG. 12, GATE indicates a gate clock as a reference, and the control signals VCTRL1 and VCTRL2 supplied to the trunk lines VCTRL1 and VCTRL2 are set such that their respective duty ratios are 1/3 and periods of the control signals VCTRL1 and VCTRL2 are identical with each other, so that the control signals VCTRL1 and VCTRL2 do not change to High simultaneously.

That is, the control signals VCTRL1 and VCTRL2 are set to be out of phase by 1/2 period with each other.

As shown in FIG. 12, the auxiliary capacitor driving signals VCSn, VCSn+1, and the like, which are supplied respectively to the auxiliary capacitor lines CSn, CSn+1, and the like, are in synchronization with the control signals VCTRL1 and VCTRL2 supplied to the trunk lines VCTRL1 and VCTRL2, at the rising timing of the control signals VCTRL1 and VCTRL2. Therefore, even when the duty ratios of the control signals VCTRL1 and VCTRL2 are changed to 1/3, the duty ratios of the auxiliary capacitor driving signals VCSn, VCSn+1, and the like can be maintained to be 1/2 as long as the periods of the control signals VCTRL1 and VCTRL2 are identical with each other.

Figure 13:
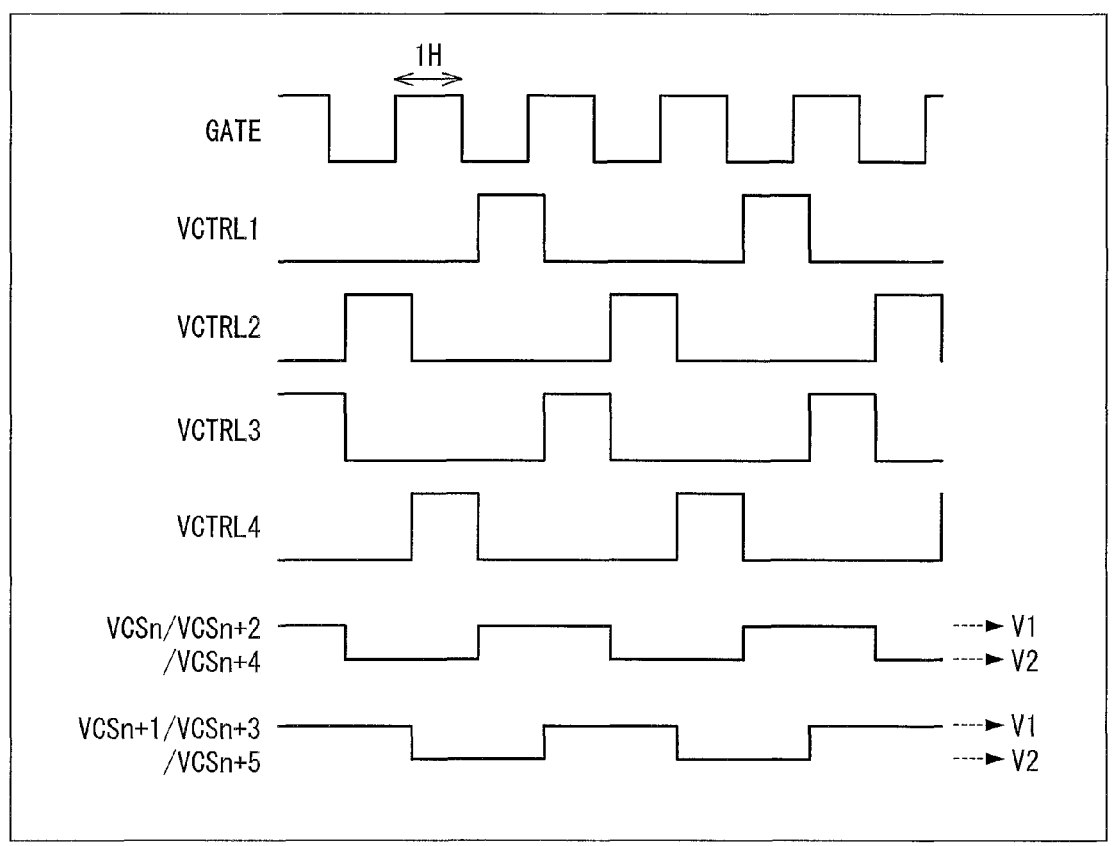
FIG. 13

FIG. 13 is a view showing waveforms of control signals (clock signals) supplied to the trunk lines VCTRL1, VCTRL2, VCTRL3, and VCTRL4 with reference to a gate clock and waveforms of voltages supplied to the auxiliary capacitor lines CSn, CSn+1, and the like, in a liquid crystal display device according to Embodiment 5.

In FIG. 13, GATE indicates a gate clock as a reference, and the control signals VCTRL1, VCTRL2, VCTRL3, and VCTRL4 supplied to the trunk lines VCTRL1, VCTRL2, VCTRL3, and VCTRL4 are set such that their respective duty ratios are 1/4 and periods of the control signals VCTRL1, VCTRL2, VCTRL3, and VCTRL4 are identical with each other, so that the control signals VCTRL1, VCTRL2, VCTRL3, and VCTRL4 do not change to High simultaneously.

That is, the control signals VCTRL1, VCTRL2, VCTRL3, and VCTRL4 are set to be out of phase by 1/4 period with each other.

In this case, the configuration is different from the configuration described in Embodiment 1 in that four trunk lines are required to supply the control signals VCTRL1, VCTRL2, VCTRL3, and VCTRL4.

As shown in FIG. 13, the auxiliary capacitor driving signals VCSn, VCSn+2, and the like, which are supplied respectively to the auxiliary capacitor lines CSn, CSn+2, CSn+4 and the like, are in synchronization with the control signals VCTRL1 and VCTRL2 supplied to the trunk lines VCTRL1 and VCTRL2, at the rising timing of the control signals VCTRL1 and VCTRL2. The auxiliary capacitor driving signals VCSn+1, VCSn+3, and the like, which are supplied respectively to the auxiliary capacitor lines CS+1, CSn+3, CSn+5, and the like, are in synchronization with the control signals VCTRL3 and VCTRL4 supplied to the trunk lines VCTRL3 and VCTRL4, at the rising timing of the control signals VCTRL3 and VCTRL4.

In the above arrangement, even when the duty ratios of the control signals VCTRL1, VCTRL2, VCTRL3, and VCTRL4 are changed to 1/4, the duty ratios of the auxiliary capacitor driving signals VCSn, VCSn+1, and the like can be maintained to be 1/2 as long as the periods of the control signals VCTRL1, VCTRL2, VCTRL3, and VCTRL4 are identical with each other.

In FIG. 13, after the gate clock GATE changes from High to Low, both the auxiliary capacitor driving signals VCSn, VCSn+2, and VCSn+4 and the auxiliary capacitor driving signals VCSn+1, VCSn+3, and VCSn+5 change from Low to High. This requires interchanging the control signals VCTRL3 and VCTRL4 and making phases of the auxiliary capacitor driving signals VCSn+1, VCSn+3, and VCSn+5 opposite to the phases shown in FIG. 13, in order to carry out 1H dot reversal driving.

In the liquid crystal display device according to Embodiment 5, the on time of the control signal is reduced within the bounds of sufficiently charging the auxiliary capacitor lines. This makes it possible to prevent the deterioration of the TFTs provided in the auxiliary capacitor line driving circuit of the liquid crystal display device.

A liquid crystal display device of the present invention is preferably such that the switching elements are N-type semiconductor elements, the first voltage trunk line is connected to the auxiliary capacitor lines via first N-type semiconductor elements, the second voltage trunk line is connected to the auxiliary capacitor lines via second N-type semiconductor elements, to the first N-type semiconductor elements is supplied any one of at least two control signals being identical in vibration period and being out of phase with each other so as not to rise simultaneously, to the second N-type semiconductor elements is supplied the other control signal of the at least two control signals, the other control signal being not the control signal supplied to the first N-type semiconductor elements, when the control signal supplied to the first N-type semiconductor elements is rising, the first N-type semiconductor elements allow the first voltage trunk line and the auxiliary capacitor lines to be electrically conductive, and when the control signal supplied to the second N-type semiconductor elements is rising, the second N-type semiconductor elements allow the second voltage trunk line and the auxiliary capacitor lines to be electrically conductive.

A liquid crystal display device of the present invention is preferably such that the switching elements are P-type semiconductor elements, the first voltage trunk line is connected to the auxiliary capacitor lines via first P-type semiconductor elements, the second voltage trunk line is connected to the auxiliary capacitor lines via second P-type semiconductor elements, to the first P-type semiconductor elements is supplied any one of at least two control signals being identical in vibration period and being out of phase with each other so as not to fall simultaneously, to the second P-type semiconductor elements is supplied the other control signal of the at least two control signals, the other control signal being not the control signal supplied to the first P-type semiconductor elements, when the control signal supplied to the first P-type semiconductor element is falling, the first P-type semiconductor elements allow the first voltage trunk line and the auxiliary capacitor lines to be electrically conductive, and when the control signal supplied to the second P-type semiconductor element is falling, the second P-type semiconductor elements allow the second voltage trunk line and the auxiliary capacitor lines to be electrically conductive.

According to the above-described configuration, either the N-type semiconductor elements or the P-type semiconductor elements are used as the switching elements. This needs only to provide the first and second voltage trunk lines carrying two different voltages, respectively, and at least two control signal lines carrying individual control signals. The above-described configuration allows significant reduction of the number of lines to be provided, as compared to the conventional configuration.

Therefore, it is possible to achieve narrowing of a picture frame region as a non-display region and an external circuit board, in a liquid crystal display device employing a multi-picture element drive method.

A liquid crystal display device of the present invention is preferably such that the switching elements are complementary semiconductor elements being combinations of P-type semiconductor elements and N-type semiconductor elements, the first voltage trunk line is connected to the auxiliary capacitor lines via one type of the P-type semiconductor elements and the N-type semiconductor elements provided in the complementary semiconductor elements, the second voltage trunk line is connected to the auxiliary capacitor lines via the other type of semiconductor elements provided in the complementary semiconductor elements, one control signal vibrating periodically is supplied to the N-type semiconductor elements and the P-type semiconductor elements of the complementary semiconductor elements, when the control signal supplied to the N-type semiconductor elements of the complementary semiconductor elements is rising, the N-type semiconductor elements of the complementary semiconductor elements allow both one voltage trunk line connected to the N-type semiconductor elements out of the first and second voltage trunk lines and the auxiliary capacitor lines to be electrically conductive, and when the control signal supplied to the P-type semiconductor elements of the complementary semiconductor elements is falling, the P-type semiconductor elements of the complementary semiconductor elements allow both the other voltage trunk line connected to the P-type semiconductor elements and the auxiliary capacitor lines to be electrically conductive.

A liquid crystal display device of the present invention is preferably such that the switching elements are complementary semiconductor elements being combinations of P-type semiconductor elements and N-type semiconductor elements, the first voltage trunk line is connected to the auxiliary capacitor lines via one type of the P-type semiconductor elements and the N-type semiconductor elements provided in the complementary semiconductor elements, the second voltage trunk line is connected to the auxiliary capacitor lines via the other type of semiconductor elements provided in the complementary semiconductor elements, to the N-type semiconductor elements provided in the complementary semiconductor elements is supplied one of two control signals being identical in vibration period and being out of phase with each other so that a rise period of one of the control signals does not overlap a fall period of the other control signal, to the P-type semiconductor elements provided in the complementary semiconductor elements is supplied the other of the two control signals, when the control signal supplied to the N-type semiconductor elements of the complementary semiconductor elements is rising, the N-type semiconductor elements of the complementary semiconductor elements allow both one voltage trunk line connected to the N-type semiconductor elements out of the first and second voltage trunk lines and the auxiliary capacitor lines to be electrically conductive, and when the control signal supplied to the P-type semiconductor elements of the complementary semiconductor elements is falling, the P-type semiconductor elements of the complementary semiconductor elements allow both the other voltage trunk line connected to the P-type semiconductor elements and the auxiliary capacitor lines to be electrically conductive.

According to the above-described configuration, the complementary semiconductor elements that are combinations of the P-type semiconductor elements and the N-type semiconductor elements are used as the switching elements. This needs only to provide the first and second voltage trunk lines carrying two different voltages, respectively, and at least one control signal lines carrying a control signal. The above-described configuration allows significant reduction of the number of lines to be provided, as compared to the conventional configuration.

Therefore, it is possible to achieve further narrowing of a picture frame region as a non-display region and an external circuit board, in a liquid crystal display device employing a multi-picture element drive method.

A liquid crystal display device of the present invention is preferably such that a voltage at the rise of the control signal is set to be higher than any voltages supplied to the first and second voltage trunk lines, a voltage at the fall of the control signal is set to be lower than any voltages supplied to the first and second voltage trunk lines, in a case where the voltage supplied to the first voltage trunk line is higher than the voltage supplied to the second voltage trunk line, the control signal line which carries the control signal to the first N-type semiconductor elements is connected via capacitors to the auxiliary capacitor lines connected to the first N-type semiconductor elements, and in a case where the voltage supplied to the second voltage trunk line is higher than the voltage supplied to the first voltage trunk line, the control signal line which carries the control signal to the second N-type semiconductor elements is connected via capacitors to the auxiliary capacitor lines connected to the second N-type semiconductor elements.

A liquid crystal display device of the present invention is preferably such that a voltage at the rise of the control signal is set to be higher than any voltages supplied to the first and second voltage trunk lines, a voltage at the fall of the control signal is set to be lower than any voltages supplied to the first and second voltage trunk lines, in a case where the voltage supplied to the first voltage trunk line is higher than the voltage supplied to the second voltage trunk line, the control signal line which carries the control signal to the second P-type semiconductor elements is connected via capacitors to the auxiliary capacitor lines connected to the second P-type semiconductor elements, and in a case where the voltage supplied to the second voltage trunk line is higher than the voltage supplied to the first voltage trunk line, the control signal line which carries the control signal to the first P-type semiconductor elements is connected via capacitors to the auxiliary capacitor lines connected to the first P-type semiconductor elements.

According to the above-described configuration, a voltage at the rise of the control signal which voltage is set to be higher than any voltages supplied to the first and second voltage trunk lines or a voltage at the fall of the control signal which voltage is set to be lower than any voltages supplied to the first and second voltage trunk lines is supplied to the auxiliary capacitor lines.

Therefore, it is possible to improve signal distortion on the rising edge or falling edge due to the signal delay, as compared to the auxiliary capacitor driving signal generated by the conventional auxiliary capacitor line driving circuit.

As described above, the auxiliary capacitor line driving circuit has the pre-emphasis function, the so-called overshoot function. This makes it possible to reduce a time required to charge the auxiliary capacitor elements connected to the auxiliary capacitor lines, without the need for addition of externally supplied signals. This makes it possible to quickly achieve driving of a plurality of sub-picture elements.

Further, even when the driving time is shortened due to increase in number of the scanning lines, it is possible to prevent luminance unevenness and display variations.

A liquid crystal display device of the present invention is preferably such that the first voltage trunk line is connected to the auxiliary capacitor lines via the N-type semiconductor elements of the complementary semiconductor elements, the second voltage trunk line is connected to the auxiliary capacitor lines via the P-type semiconductor elements of the complementary semiconductor elements, a voltage at the rise of the control signal is set to be higher than any voltages supplied to the first and second voltage trunk lines, a voltage at the fall of the control signal is set to be lower than any voltages supplied to the first and second voltage trunk lines, the voltage supplied to the first voltage trunk line is set to be higher than the voltage supplied to the second voltage trunk line, and the control signal line which carries the control signal to one type of the N-type and P-type semiconductor elements of the complementary semiconductor elements is connected via capacitors to the auxiliary capacitor lines connected to the one type of semiconductor elements provided in the respective complementary semiconductor elements.

According to the above-described configuration, even when the complementary semiconductor elements that are combinations of the P-type semiconductor elements and the N-type semiconductor elements are used as the switching elements, a voltage at the rise of the control signal which voltage is set to be higher than any voltages supplied to the first and second voltage trunk lines or a voltage at the fall of the control signal which voltage is set to be lower than any voltages supplied to the first and second voltage trunk lines is supplied to the auxiliary capacitor lines.

Therefore, it is possible to improve signal distortion on the rising edge or falling edge due to the signal delay, as compared to the auxiliary capacitor driving signal generated by the conventional auxiliary capacitor line driving circuit.

A liquid crystal display device of the present invention is preferably such that the control signal is used as a control signal for the scanning line driving circuit.

According to the above-described configuration, the control signal supplied to the scanning line driving circuit and the control signal supplied to the auxiliary capacitor line driving circuit are unified. This makes it possible to reduce the number of lines to be provided, as compared to the conventional configuration.

Therefore, it is possible to achieve further narrowing of a picture frame region as a non-display region and an external circuit board, in a liquid crystal display device employing a multi-picture element drive method.

A liquid crystal display device of the present invention is preferably such that a clock signal is used as the control signal.

A liquid crystal display device of the present invention is preferably such that the auxiliary capacitor line driving circuit and the active elements provided to the sub-picture elements are monolithically formed.

According to the above-described configuration, it is possible to achieve a liquid crystal display device of high reliability with a narrowed picture frame region as a non-display region.

Further, by using amorphous semiconductors to monolithically form the auxiliary capacitor line driving circuit and the active elements, it is possible to produce the above-described liquid crystal display device at relatively low cost.

A liquid crystal display device of the present invention is preferably such that in the surrounding region located around the display region in the liquid crystal display panel, the scanning line driving circuit is monolithically formed with the auxiliary capacitor line driving circuit and the active elements.

According to the above-described configuration, it is possible to achieve a liquid crystal display device of high reliability with a narrowed picture frame region as a non-display region.

Further, by using amorphous semiconductors to monolithically form the scanning line driving circuit, the auxiliary capacitor line driving circuit, and the active elements, it is possible to produce the above-described liquid crystal display device at relatively low cost.

A liquid crystal display device of the present invention is preferably such that the control signal has a duty ratio of less than 1/2.

With regard to a TFT including, for example, an amorphous silicon layer (a-Si layer) that is an amorphous semiconductor layer, it is known that deterioration in characteristics of the TFT (variations of a threshold value Vth) occurs when a gate electrode of the TFT is under a voltage stress.

In addition, it is known that a coefficient of the deterioration (variations of the threshold value Vth) varies in its absolute value with respect to stress of a positive voltage and stress of a negative voltage, both of which are opposite in polarity, and that the deterioration (variations of the threshold value Vth) becomes more severe under the positive voltage stress.

According to the above-described configuration, a control signal having a duty ratio of less than 1/2 is supplied to the auxiliary capacitor line driving circuit, so that a time for the positive voltage stress is less than a time for the negative voltage stress, and the characteristics of the TFTs provided in the auxiliary capacitor line driving circuit can be thus prevented from being deteriorated.

Therefore, by reducing the rise time of the control signal within the bounds of sufficiently charging the auxiliary capacitor lines, it is possible to prevent the deterioration of the TFTs provided in the auxiliary capacitor line driving circuit of the liquid crystal display device.

Note that the duty ratio is a ratio of (an area of a rising region of the control signal) to (the area of the rising region of the control signal and an area of a falling region of the control signal) in one cycle of the control signal.

A liquid crystal display device of the present invention is preferably such that the first voltage trunk line and the second voltage trunk line are formed so as to match via an insulating layer, when viewed from a top of the liquid crystal display device.

According to the above-described configuration, the first and second voltage trunk lines are provided so as to match each other via an insulating layer when viewed from a top of the liquid crystal display device, thereby producing decoupling capacitors. This makes it possible to prevent an unstable power supply voltage.

Moreover, it is possible to further reduce a proportion of the area where the first and second voltage trunk lines are formed. This makes it possible to achieve further narrowing of the picture frame region as the non-display region.

A liquid crystal display device of the present invention is preferably such that in a row direction of the sub-picture elements, which direction is equal to a direction to which the signal lines extend, the auxiliary capacitor line provided between the sub-picture elements adjacent to each other is electrically connected to the auxiliary capacitor elements provided in the respective sub-picture elements.

According to the above-described configuration, it is possible to reduce the area where the auxiliary capacitor lines as the non-display region in each of the picture elements are formed. This makes it possible to achieve a liquid crystal display device with an enhanced aperture ratio.

A liquid crystal display device of the present invention is preferably such that the two different voltages supplied to the first and second voltage trunk lines and the control signal are supplied from an external circuit board.

According to the above-described configuration, it is possible to reduce the number of input signals from the external circuit board, as compared to the conventional configuration. This makes it possible to reduce the size of the external circuit board and the cost of parts of the external circuit board, thus enabling provision of a liquid crystal display device with reduced manufacturing cost.

The present invention is not limited to the aforementioned embodiments and is susceptible of various changes within the scope of the accompanying claims. That is, embodiments obtained by suitable combinations of technical means disclosed in different embodiments are also included within the technical scope of the present invention.

Industrial Applicability

The present invention is applicable to a liquid crystal display device.

REFERENCE SIGNS LIST

1 Liquid crystal display device
2 Liquid crystal display panel
3 Signal line driving circuit
4 Scanning line driving circuit
5, 5a, 5b, and 5c
  Auxiliary capacitor line driving circuits
Control board (external circuit board)
8 TFT (active element)
R1 Display region
CSn Auxiliary capacitor line
P Picture element
PA, PB Sub-picture elements
VCS1 and VCS2
  Trunk lines (first and second voltage trunk lines)
VCTRL1, VCTRL 2, VCTRL 3, and VCTRL4
  Trunk lines (control signal lines)
T1, T2, T3, and T4
  TFTs (switching elements and semiconductor elements)

The invention claimed is:

1. A liquid crystal display device comprising:
  a liquid crystal display panel including a display region, the display region including: (i) picture elements each of which is made up of a plurality of sub-picture elements; and (ii) active elements provided respectively to the sub-picture elements;
  a scanning line driving circuit that supplies scan signals to scanning lines provided in the display region; and
  a signal line driving circuit that supplies data signals to signal lines provided in the display region,
  the sub-picture elements having respective auxiliary capacitor elements, the auxiliary capacitor elements being connected respectively to different auxiliary capacitor lines,
  the auxiliary capacitor elements being driven in accordance with auxiliary capacitor driving signals supplied respectively to the auxiliary capacitor lines, so that the sub-picture elements provide displays of mutually different luminances, wherein
  an auxiliary capacitor line driving circuit, provided in a surrounding region located around the display region in the liquid crystal display panel, which generates the auxiliary capacitor driving signals is such that:
  a first voltage trunk line is connected to the auxiliary capacitor lines via first N-type semiconductor elements,
  a second voltage trunk line, which supplies a voltage that is different from a voltage supplied to the first voltage trunk line, is connected to the auxiliary capacitor lines via second N-type semiconductor elements,
  any one of at least two control signals being identical in switching period and being out of phase with each other so as not to rise simultaneously is supplied to the first N-type semiconductor elements,
  another control signal of the at least two control signals, that is not the control signal supplied to the first N-type semiconductor elements, is supplied to the second N-type semiconductor elements,
  a voltage at the rise of the at least two control signals is set to be higher than any voltages supplied to the first and second voltage trunk lines,
  a voltage at the fall of the at least two control signals is set to be lower than any voltages supplied to the first and second voltage trunk lines,
  when the control signal supplied to the first N-type semiconductor elements is rising, the first N-type semiconductor elements allow the first voltage trunk line and the auxiliary capacitor lines to be electrically conductive,
  when the control signal supplied to the second N-type semiconductor elements is rising, the second N-type semiconductor elements allow the second voltage trunk line and the auxiliary capacitor lines to be electrically conductive,
  in a case where the voltage supplied to the first voltage trunk line is set to be higher than the voltage supplied to the second voltage trunk line, a control signal line which carries the control signal to the first N-type semiconductor elements is connected via capacitors to the auxiliary capacitor lines connected to the first N-type semiconductor elements, and
  in a case where the voltage supplied to the second voltage trunk line is set to be higher than the voltage supplied to the first voltage trunk line, a control signal line which carries the control signal to the second N-type semiconductor elements is connected via capacitors to the auxiliary capacitor lines connected to the second N-type semiconductor elements.

2. The liquid crystal display device according to claim 1, wherein the at least two control signals are used as a control signal for the scanning line driving circuit.

3. The liquid crystal display device according to claim 1, wherein a clock signal is used as the at least two control signals.

4. The liquid crystal display device according to claim 1, wherein the auxiliary capacitor line driving circuit and the active elements provided to the sub-picture elements are monolithically formed.

5. The liquid crystal display device according to claim 1, wherein in the surrounding region located around the display region in the liquid crystal display panel, the scanning line driving circuit is monolithically formed with the auxiliary capacitor line driving circuit and the active elements.

6. The liquid crystal display device according to claim 1, wherein
  each of the semiconductor elements is a transistor including an amorphous silicon layer, and
  the at least two control signals have a duty ratio of less than 1/2.

7. The liquid crystal display device according to claim 1, wherein the first voltage trunk line and the second voltage trunk line are arranged so as to match via an insulating layer, when viewed from a top of the liquid crystal display device.

8. The liquid crystal display device according to claim 1, wherein in a row direction of the sub-picture elements, which direction is equal to a direction to which the signal lines extend, the auxiliary capacitor line provided between the sub-picture elements adjacent to each other is electrically connected to the auxiliary capacitor elements provided in the respective sub-picture elements.

9. The liquid crystal display device according to claim 1, wherein the two different voltages supplied to the first and second voltage trunk lines and the control signal are supplied from an external circuit board.

10. The liquid crystal display device according to claim 1, wherein each of the semiconductor elements provided in the auxiliary capacitor line driving circuit is made of a metal-oxide semiconductor.

11. A liquid crystal display device comprising:
a liquid crystal display panel including a display region, the display region including: (i) picture elements each of which is made up of a plurality of sub-picture elements; and (ii) active elements provided respectively to the sub-picture elements;
a scanning line driving circuit that supplies scan signals to scanning lines provided in the display region; and
a signal line driving circuit that supplies data signals to signal lines provided in the display region,
the sub-picture elements having respective auxiliary capacitor elements, the auxiliary capacitor elements being connected respectively to different auxiliary capacitor lines,
the auxiliary capacitor elements being driven in accordance with auxiliary capacitor driving signals supplied respectively to the auxiliary capacitor lines, so that the sub-picture elements provide displays of mutually different luminances, wherein
an auxiliary capacitor line driving circuit, provided in a surrounding region located around the display region in the liquid crystal display panel, which generates the auxiliary capacitor driving signals is such that:
a first voltage trunk line is connected to the auxiliary capacitor lines via first P-type semiconductor elements,
a second voltage trunk line, which supplies a voltage that is different from a voltage supplied to the first voltage trunk line, is connected to the auxiliary capacitor lines via second P-type semiconductor elements,
any one of at least two control signals being identical in switching period and being out of phase with each other so as not to fall simultaneously is supplied to the first P-type semiconductor elements,
another control signal of the at least two control signals, the other that is not the control signal supplied to the first P-type semiconductor elements, is supplied to the second P-type semiconductor elements,
a voltage at the rise of the at least two control signals is set to be higher than any voltages supplied to the first and second voltage trunk lines,
a voltage at the fall of the at least two control signals is set to be lower than any voltages supplied to the first and second voltage trunk lines,
when the control signal supplied to the first P-type semiconductor elements is falling, the first P-type semiconductor elements allow the first voltage trunk line and the auxiliary capacitor lines to be electrically conductive,
when the control signal supplied to the second P-type semiconductor elements is falling, the second P-type semiconductor elements allow the second voltage trunk line and the auxiliary capacitor lines to be electrically conductive,
in a case where the voltage supplied to the first voltage trunk line is set to be higher than the voltage supplied to the second voltage trunk line, a control signal line which carries the control signal to the second P-type semiconductor elements is connected via capacitors to the auxiliary capacitor lines connected to the second P-type semiconductor elements, and
in a case where the voltage supplied to the second voltage trunk line is set to be higher than the voltage supplied to the first voltage trunk line, a control signal line which carries the control signal to the first P-type semiconductor elements is connected via capacitors to the auxiliary capacitor lines connected to the first P-type semiconductor elements.

12. A liquid crystal display device comprising:
a liquid crystal display panel including a display region, the display region including: (i) picture elements each of which is made up of a plurality of sub-picture elements; and (ii) active elements provided respectively to the sub-picture elements;
a scanning line driving circuit that supplies scan signals to scanning lines provided in the display region; and
a signal line driving circuit that supplies data signals to signal lines provided in the display region,
the sub-picture elements having respective auxiliary capacitor elements, the auxiliary capacitor elements being connected respectively to different auxiliary capacitor lines,
the auxiliary capacitor elements being driven in accordance with auxiliary capacitor driving signals supplied respectively to the auxiliary capacitor lines, so that the sub-picture elements provide displays of mutually different luminances, wherein
an auxiliary capacitor line driving circuit, provided in a surrounding region located around the display region in the liquid crystal display panel, which generates the auxiliary capacitor driving signals is such that:
a first voltage trunk line is connected to the auxiliary capacitor lines via N-type semiconductor elements of complementary semiconductor elements,
a second voltage trunk line, which supplies a voltage that is different from a voltage supplied to the first voltage trunk line, is connected to the auxiliary capacitor lines via P-type semiconductor elements of the complementary semiconductor elements,
one of at least two control signals being identical in switching period and being out of phase with each other so that a rise period of one of the control signals does not overlap a fall period of the other control signal is supplied to the N-type semiconductor elements,
another of the at least two control signals is supplied to the P-type semiconductor elements,
a voltage at the rise of the at least two control signals is set to be higher than any voltages supplied to the first and second voltage trunk lines,
a voltage at the fall of the at least two control signals is set to be lower than any voltages supplied to the first and second voltage trunk lines,
the voltage supplied to the first voltage trunk line is set to be higher than the voltage supplied to the second voltage trunk line,
when the control signal supplied to the N-type semiconductor elements is rising, the N-type semiconductor elements allow both the first voltage trunk line connected to the N-type semiconductor elements and the auxiliary capacitor lines to be electrically conductive, and when the control signal supplied to the P-type semiconductor elements is falling, the P-type semiconductor elements allow both the second voltage trunk line connected to the P-type semiconductor elements and the auxiliary capacitor lines to be electrically conductive, and a control signal line which carries the control signal to one type of the N-type and P-type semiconductor elements of the complementary semiconductor elements is connected via capacitors to the auxiliary capacitor lines connected to the one type of semiconductor elements provided in the respective complementary semiconductor elements.

* * * * *